Figure 14:
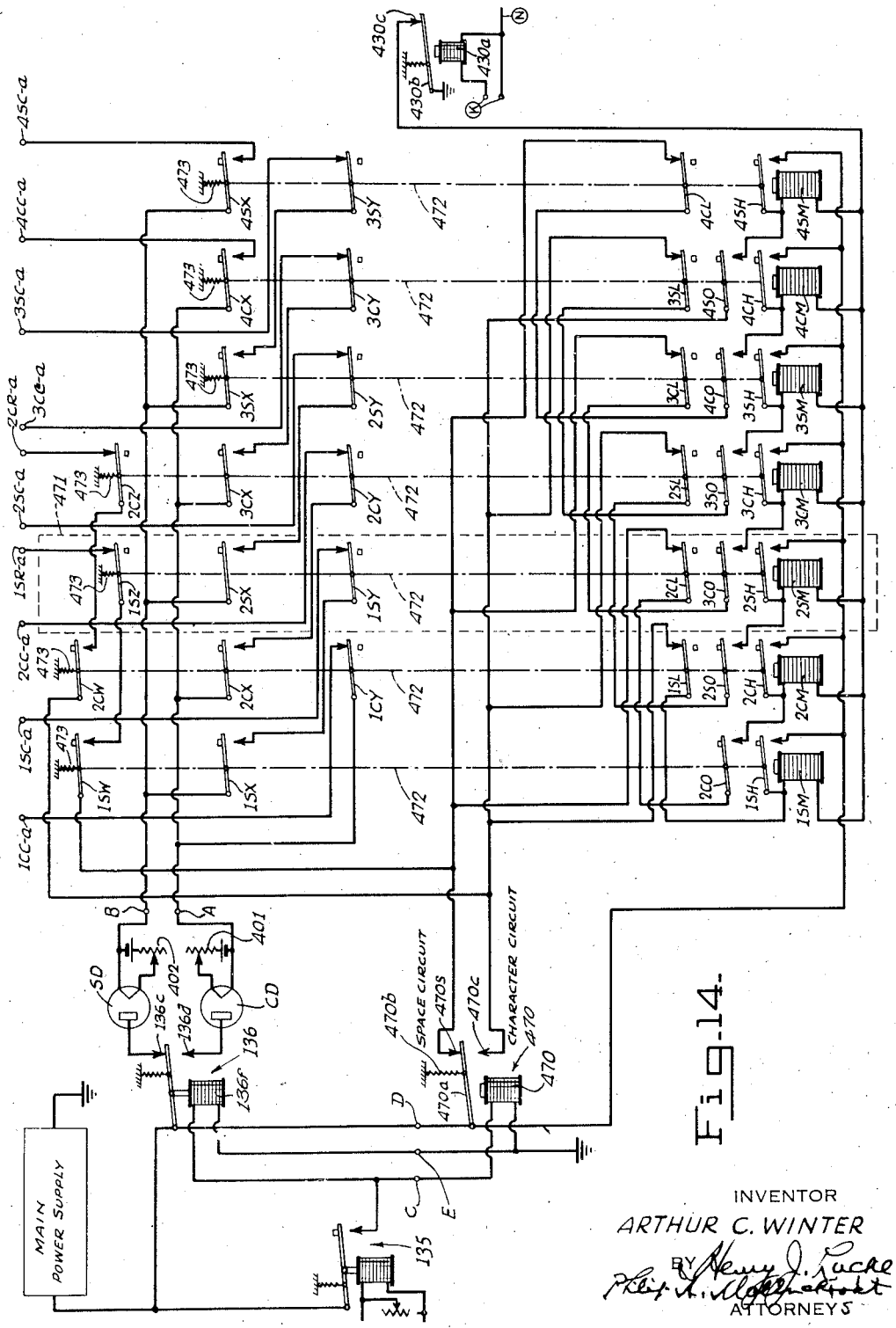

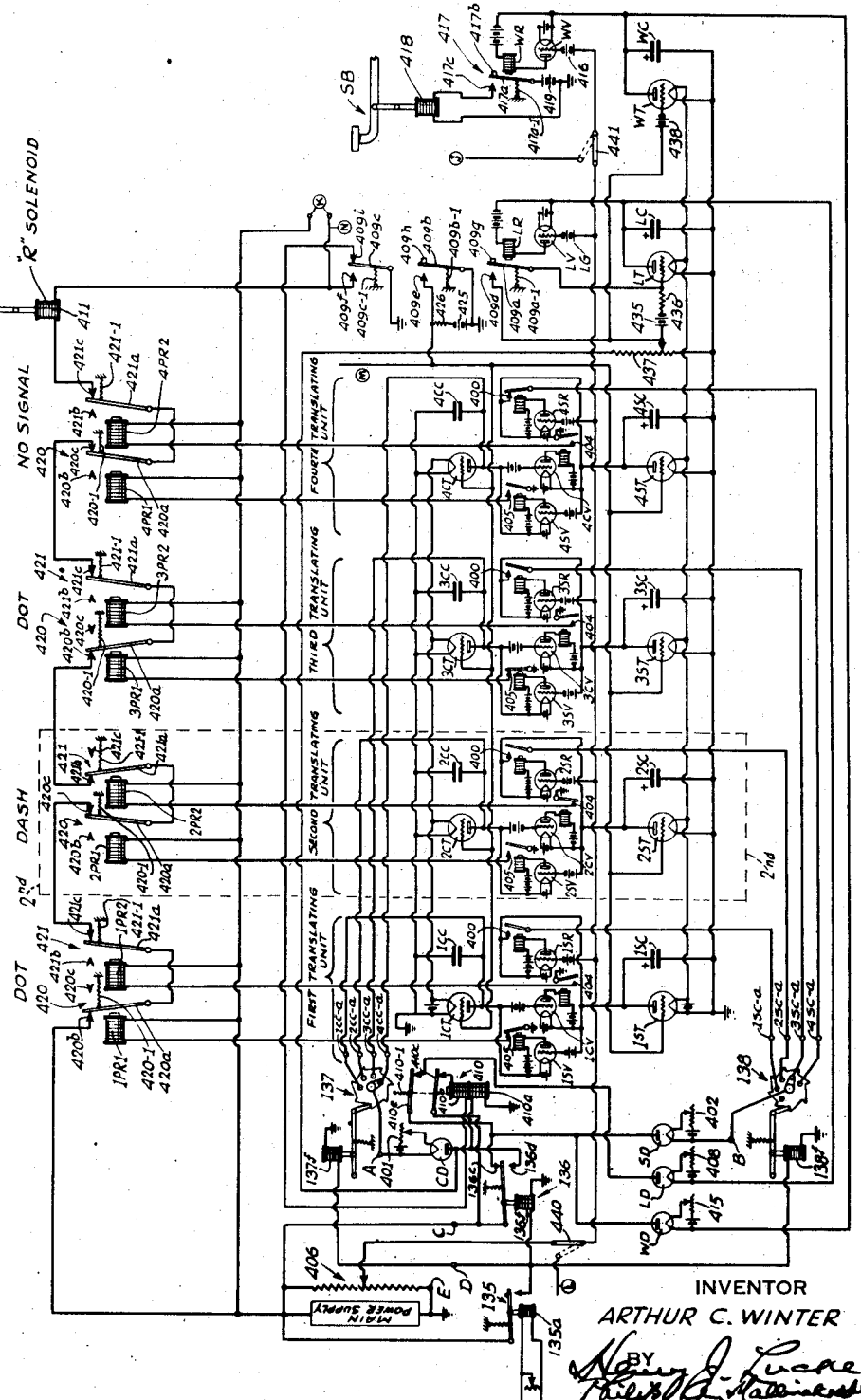

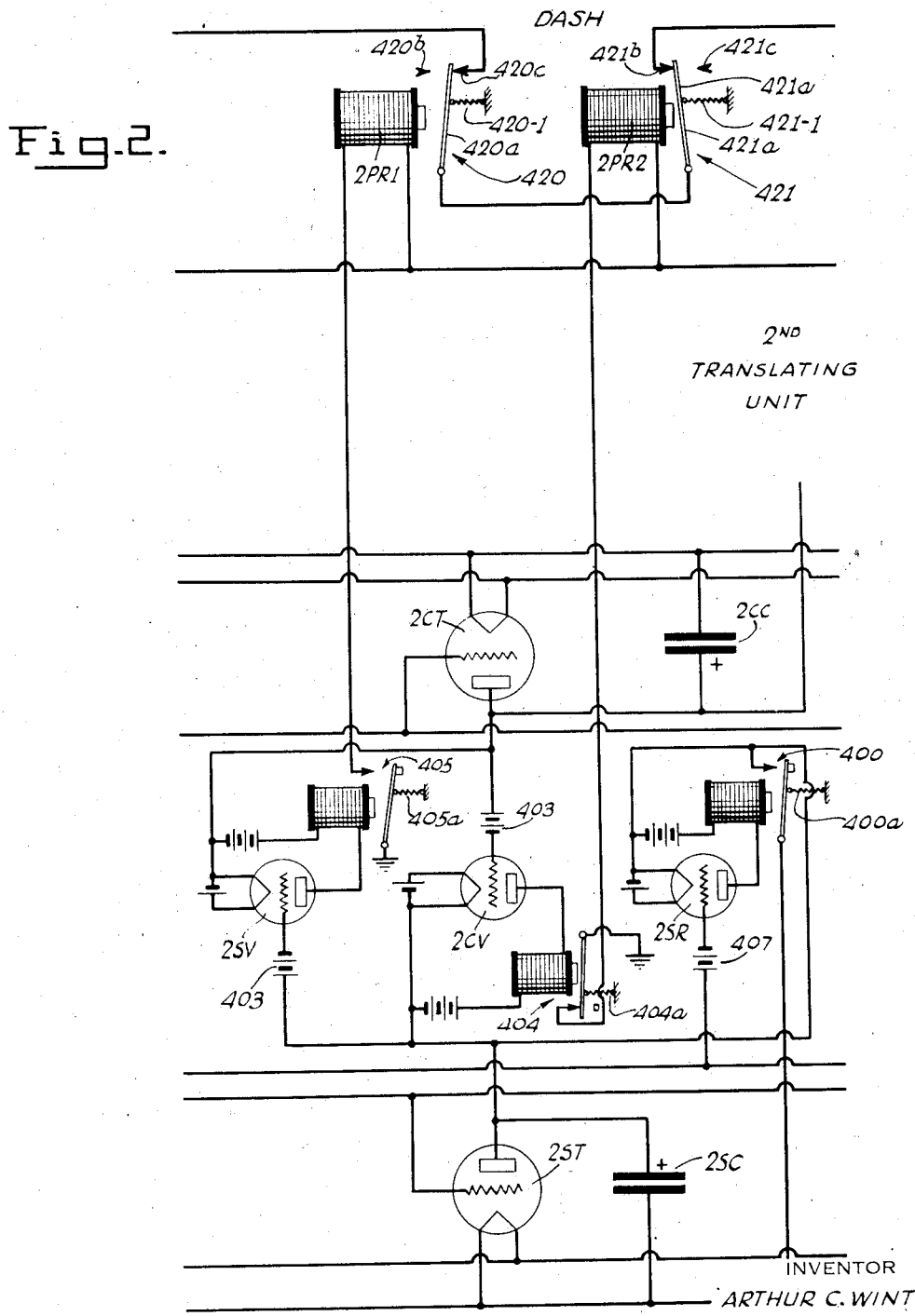

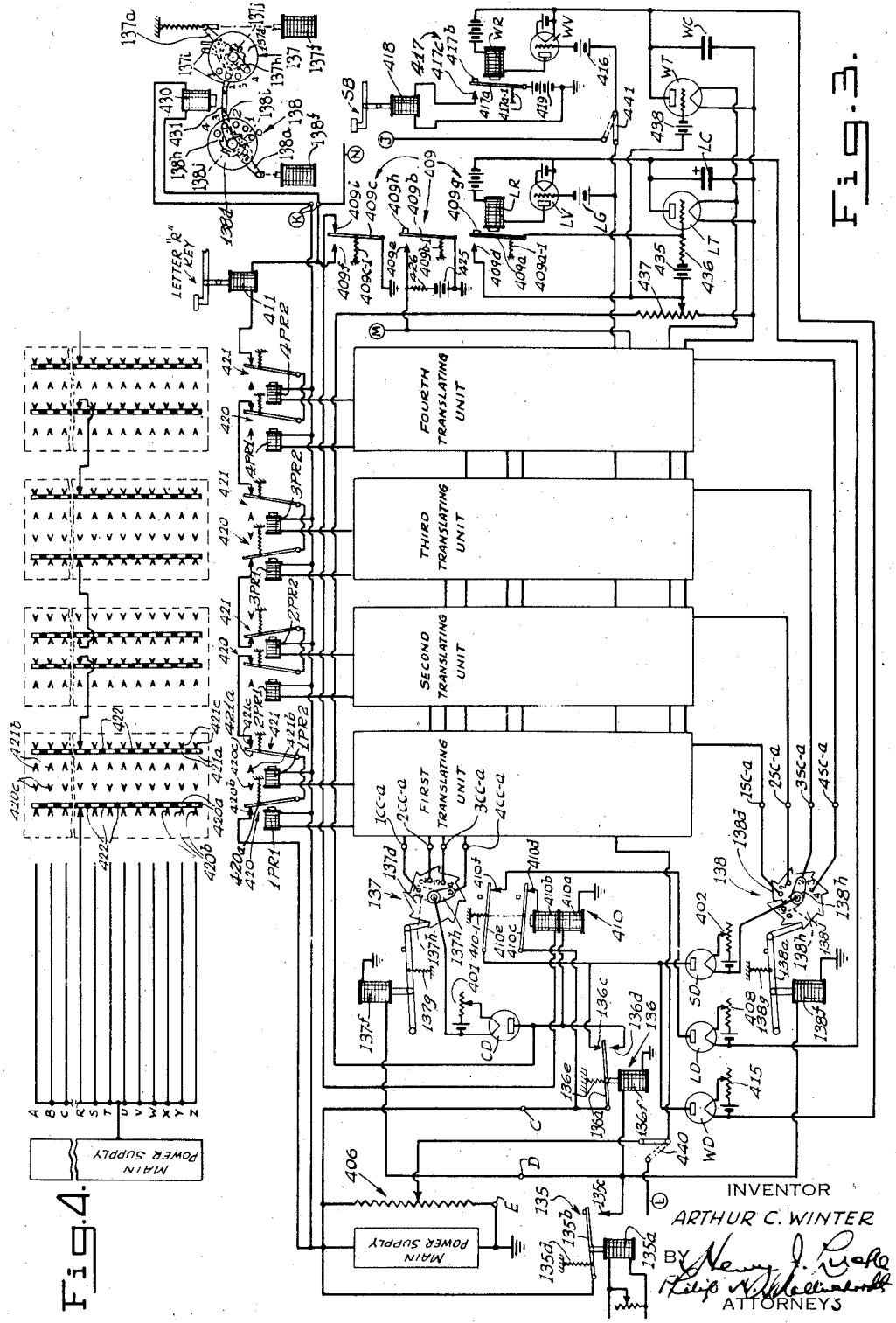

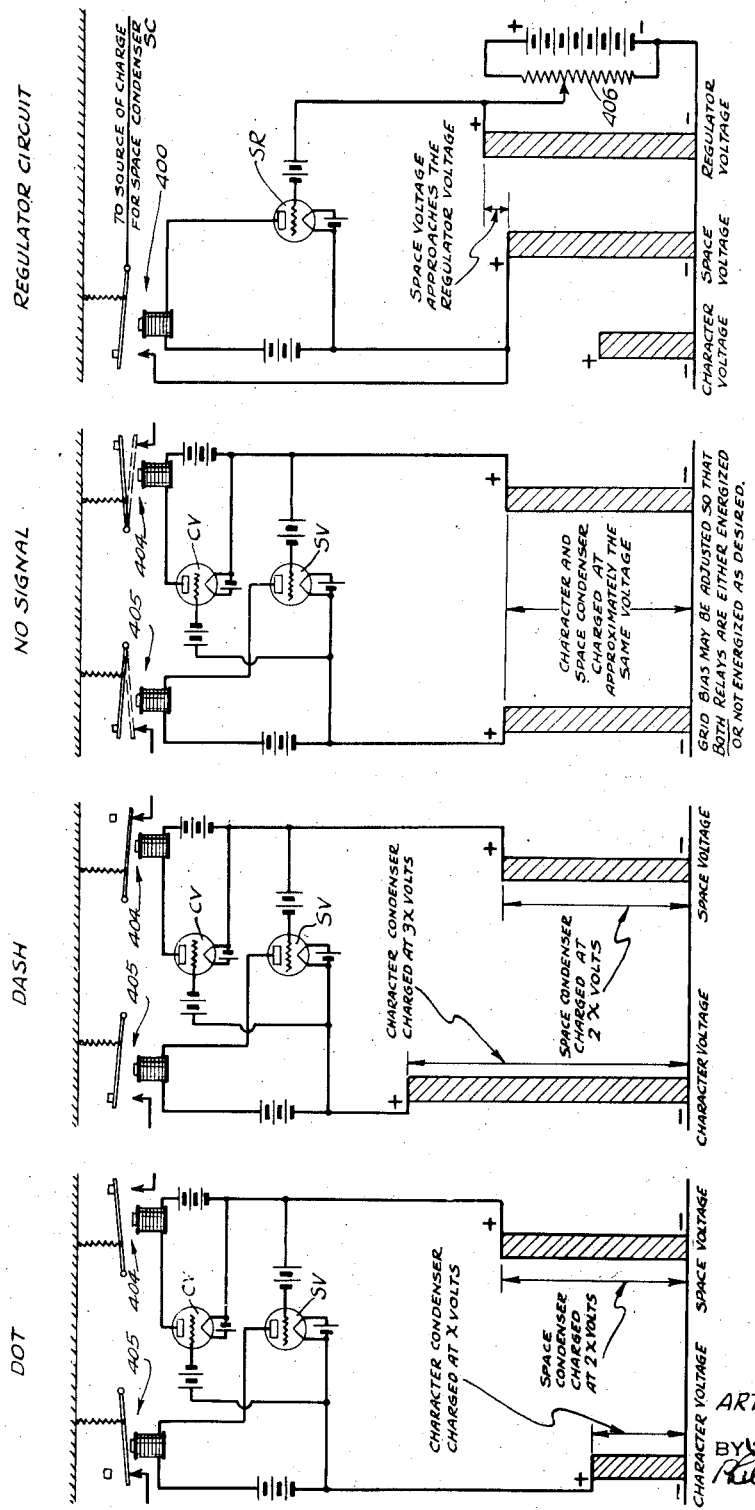

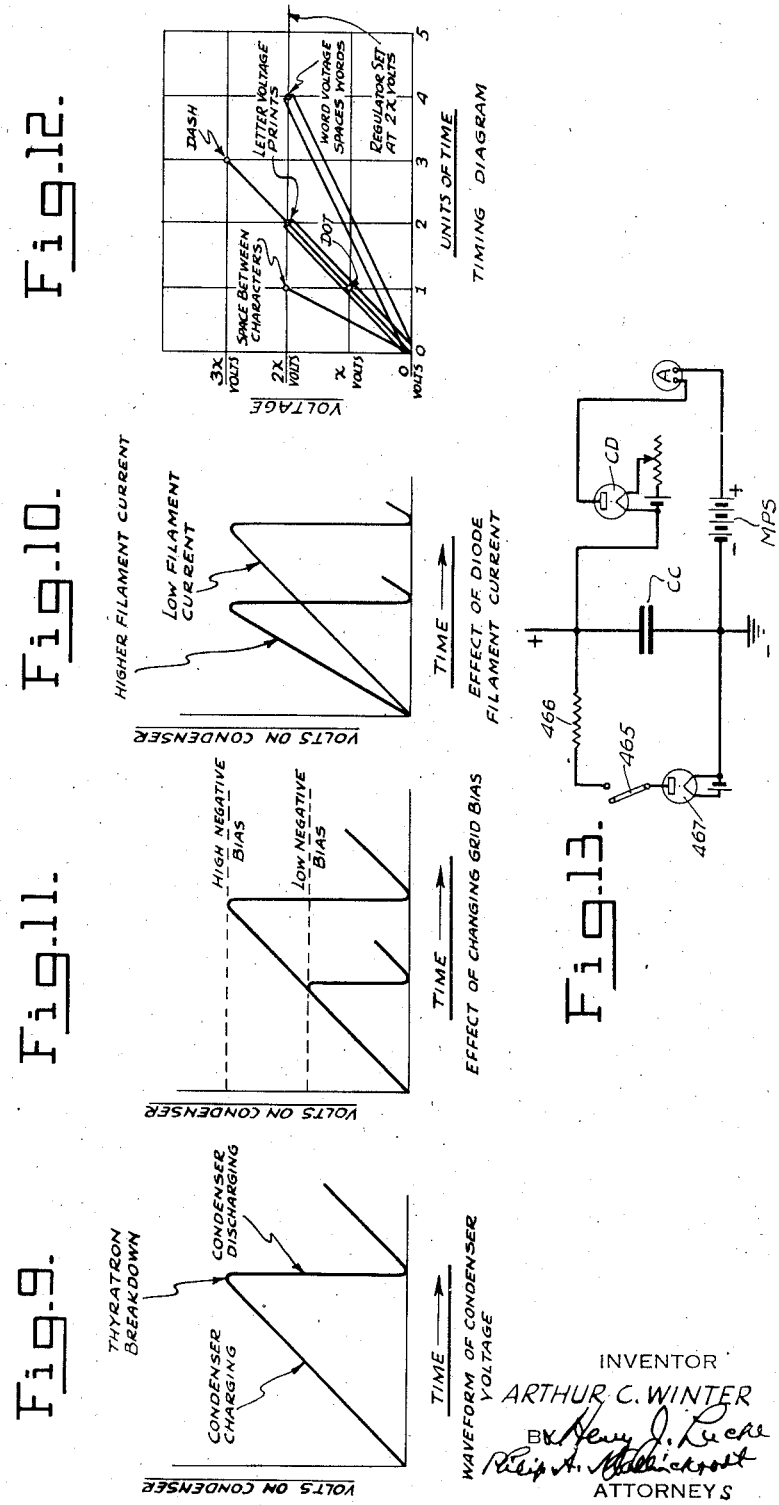

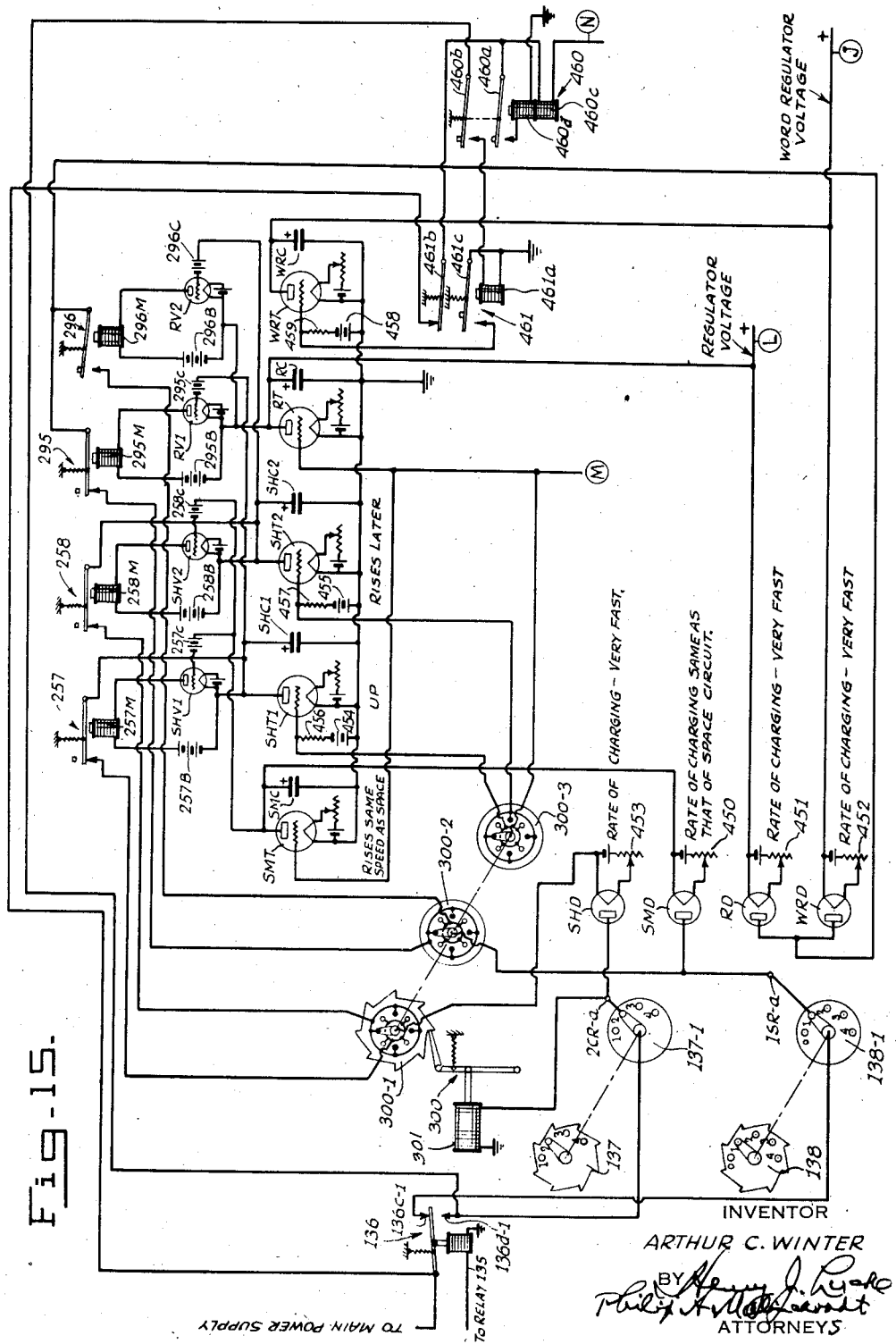

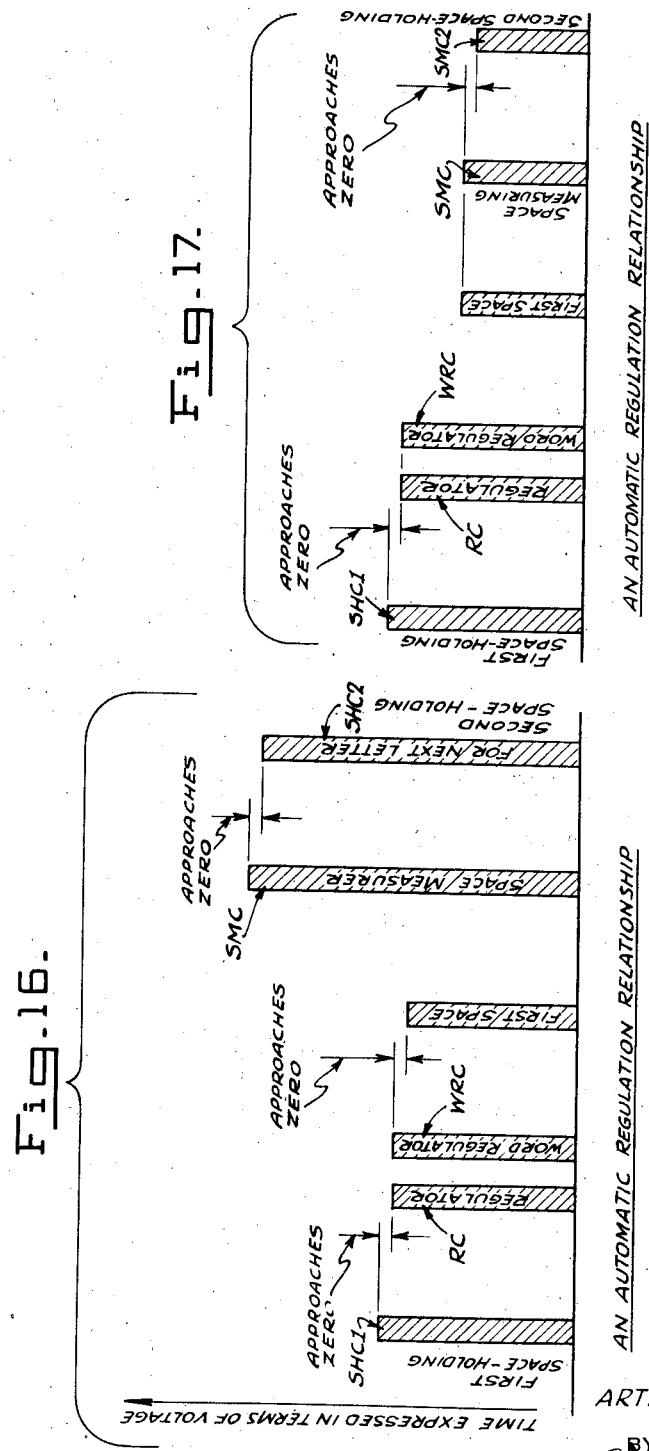

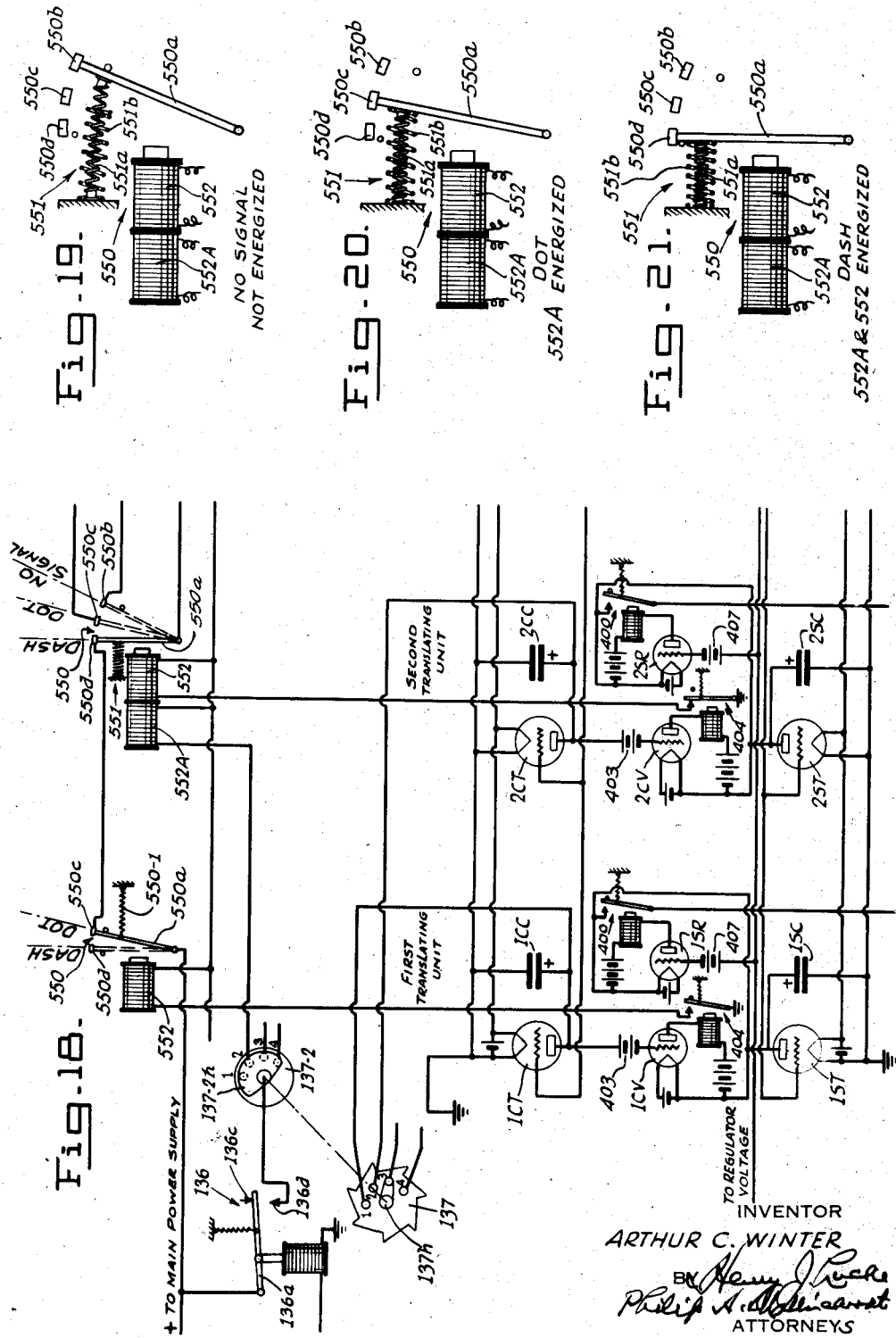

Patented Sept. 11, 1945

2,384,513

UNITED STATES PATENT OFFICE 2,384,513

CODE-CONTROLLED APPARATUS

Arthur C. Winter, Teaneck, N. J., assignor of one-tenth to Henry J. Lucke, East Orange, N. J., and one-twentieth to Philip A. Mallinckrodt, Salt Lake City, Utah Application December 28, 1943, Serial No. 515,952

23 Claims. (Cl. 178—26)

This invention relates to apparatus for producing a desired end result in accordance with code signals transmitted thereto, usually from a remote source.

The invention is closely related to that which is set forth and claimed in my co-pending application Serial No. 399,766, filed June 26, 1941, entitled Radiotelegraph recording device, now U. S. Patent No. 2,338,692, dated January 4, 1944.

The embodiments of apparatus specifically illustrated and described in that patent are representative of the generic inventive concepts there disclosed. They are composed of mechanical elements, and are controlled electrically. They are designed particularly for the receiving of radiotelegraphic code messages, and for the translating and printing of such messages in language form which is intelligible to the average person familiar with the particular language concerned.

The presently illustrated and described inventive embodiments are designed for the same particular purpose, but may be and preferably are wholly electronic and electrical in nature. They exhibit in structure and function substantially the same generic characteristics as the patented embodiments, and therefore properly come within the scope of the broad claims of the patent. Nevertheless, they present novel concepts and features which considerably simplify the apparatus, and among other advantages, make its manufacture easier and less costly, insure even greater accuracy in operative results, reduce the likelihood of operative difficulties, and lessen the cost of operation and maintenance.

Since the general factors affecting the present invention are essentially similar to those affecting the prior invention covered by the aforementioned patent, and are fully set forth therein, they are not here discussed at length.

Suffice it to say that the radiotelegraphic code ordinarily used today is the so-called Continental code, made up of dot signals, which are normally each one unit of time in length, dash signals, each three units of time in length, spaces between signals, each one unit of time in length, spaces between letter groups of signals, each three units of time in length, and spaces between word groups of letter groups, each five units of time in length.

The unit of time referred to above has no set duration, but may vary considerably in length from time to time in accordance with variations in speed of code transmission. Nevertheless, the space between successive signals in any letter group of signals is normally equal in length to a dot signal and is one-third the length of a dash signal. It can therefore be taken as a reference value in determining whether any received signal is a dot or a dash.

For the accomplishing of any desired end result in accordance with transmitted code messages, there is provided—considering the invention broadly—means for receiving the code messages, as the input part of the apparatus, and result-producing means, as the output part. Intermediate these two parts are disposed correlated code-signal and thereafter-immediately-following code-space measuring means; means for comparing the respective measured code-signals with the correlated measured code-spaces; means which are responsive to the resultant action or other positive effect of the comparing means; and settable or permutation means adapted to be variably set by the responsive means. In addition there is advantageously provided space timing means; regulator means; and release means.

The code-signal and code-space measuring means, when provided in multiple and arranged sequentially, require the further provision of distributor means for successively routing the received code-signals and thereafter-immediately-following code-spaces to their respectively proper measuring means. In this arrangement, the apparatus may be spoken of as comprising a series of individual translating units. The regulator means then serves to correlate the individual translating units, one with the other, and all with the other operative elements of the apparatus.

In the main, the objects of the present invention correspond with the objects of the prior invention, as do likewise the basic structural and functional features.

Thus, a principal object of the invention is the elimination of human operators for accurately receiving informative messages, directive impressions, or the like, transmitted in code which is composed of a series of dot and dash signals with interposed spacing.

Another important object is the provision for accurately receiving the matter transmitted whether the speed of transmission be at a slow rate or at a fast rate, or whether it be variable in character, according to the notions and human changeability of a radio operator sending the message.

Likewise, an outstanding feature of the invention is the comparing of a received code-signal with a thereafter-immediately-following received code-space of the type which occurs within a group of successive code-signals, that is, a short code-space, in order to determine whether the received signal was a dot or a dash, thereby making it possible to handle variations in speed of code transmission such as are likely to occur in the manual sending of code messages by human radio operators.

A further feature is the arrangement of identical groups of received code-signal and of thereafter-immediately-following received code-space measuring devices sequentially, in association with a space timing device, and the correlating of the several devices by a speed regulator, common thereto, which may be set from time to time, either manually or automatically, to accord with variations in speed of sending of the code messages being received.

Further objects and features of the invention will appear from the following detailed description of the preferred specific embodiments illustrated in the accompanying drawings.

In the drawings:

Fig. 1 is a wiring diagram representing the apparatus as arranged for manual control of the speed regulator;

Fig. 2, that portion of Fig. 1 which is enclosed by the dotted line 2—2, considerably enlarged;

Fig. 3, a wiring diagram corresponding to that of Fig. 1, but the several identical translating units thereof being respectively represented in placement only, thereby indicating merely their positions relative to the remaining structure, which is considerably enlarged;

Fig. 4, a top plan view, somewhat enlarged, of the permutation part of the apparatus as illustrated in Fig. 3, portions being broken out for convenience of illustration;

Fig. 5, a diagrammatic representation of the voltage relationship existing in a single translating circuit of Fig. 1 when a dot is the signal translated;

Fig. 6, a diagrammatic representation similar to that of Fig. 5 but illustrating the voltage relationship when a dash is the signal translated;

Fig. 7, a diagrammatic representation similar to those of Figs. 5 and 6 but illustrating the voltage relationship at such times as a no signal condition is registered by a translating circuit;

Fig. 8, a diagrammatic representation illustrating a voltage relationship in the speed regulator circuit;

Fig. 9 a graph plotted between volts and time and illustrative of certain functional characteristics of a single translating circuit;

Fig. 10, a similar graph illustrating a different functional characteristic;

Fig. 11, a similar graph illustrating a still different functional characteristic;

Fig. 12, a similar graph comprehending the operation of the entire apparatus illustrated in Fig. 1;

Fig. 13, a wiring diagram showing an alternative arrangement for discharging any condenser, in place of a thyratron tube of the foregoing figures;

Fig. 14, a wiring diagram detailing a distributor arrangement which may be advantageously substituted for the one illustrated in Figs. 1 and 3;

Fig. 15, a wiring diagram illustrating apparatus which may be added to the apparatus of Fig. 1 for adjusting the speed regulator automatically;

Fig. 16, a graphic representation of a certain time-voltage relationship in the automatically controlled system of the invention;

Fig. 17, a similar graphic representation of another time-voltage relationship in the automatically controlled system of the invention;

Fig. 18, a wiring diagram of a form of simplified permutation and associated translating units;

Fig. 19, an enlarged view of the simplified permutation device, illustrating the no-signal condition;

Fig. 20, an enlarged view of the simplified permutation device, illustrating the dot condition;

Fig. 21, an enlarged view of the simplified permutation device, illustrating the dash condition.

In the illustrated embodiments of the invention, the respective durations of received code signals and of received code spaces are measured in terms of voltage rather than in terms of the mechanical movements of cam elements.

Thus, instead of providing a character cam and a space cam for each translating unit, a character condenser and space condenser are provided. Likewise, instead of providing a letter cam and a word cam for the space timing unit, a letter condenser and a word condenser are employed. Furthermore, instead of using a pivoted, swinging, frame structure of a mechanical nature as the speed regulator, a voltage, which may be maintained constant or varied by means of a suitable variable resistance or rheostat, is employed.

Naturally, with the above mentioned replacement of mechanical equipment with electrical equipment, the remainder of the apparatus must be changed to suit. Therefore, electrical means are used for the purpose of charging the several condensers at respectively appropriate rates, for comparing the relative values of the character and space voltages across the respective condensers of each translating unit, and for rapidly discharging the several condensers of the system when the time arrives for the resetting of the apparatus following the printing of a letter. Such electrical means preferably take the form of suitable electronic tubes.

Reference is now made to the manually controlled apparatus of Figs. 1 through 14, wherein the various component elements are indicated by reference characters which are identical with those designating analogous elements in my aforementioned patent, and wherein there are four identical code translating units, arranged sequentially, for translating radio-telegraphic code messages into language form readable by an ordinary literate person.

*The distributor for received code*

The code-receiving relay 135, Figs. 1 and 3, has its solenoid 135a arranged to move arm 135b into electrical engagement with contact 135c when energized by the reception of a code signal, whether a dot or a dash. At all other times relay 135 is held open by the spring 135d.

The relay arm 135b is electrically connected with a main power supply (labeled such) by appropriate wiring, as illustrated, and the relay contact 135c is likewise connected to the solenoid 136f of double-keying relay 136. Since arm 136a of double-keying relay 136 is also connected to the main power supply, the engagement thereof with one or the other of its contacts 136c and 136d brings about the charging of a corresponding one or the other of the condensers of the particular translating unit concerned, the character condenser for a received code-signal and the space condenser for a thereafter-immediately-following received code-space.

The solenoid 137f of step switch 137 and the solenoid 138f of step switch 138 are both electrically connected with the relay contact 135c, so that they will be simultaneously energized upon the closing of relay 135 when a code-signal (a character) is received. As is explained in the prior application which resulted in the said Patent No. 2,338,692, the step switches 137 and 138 constitute a distributor device for directing electric current to the particular translating unit of the system appropriate for any given received code-signal and thereafter-immediately-following received code-space. In the present system, the setting of step switches 137 and 138 determines to which translating unit of the several translating units of the system, current, corresponding to a received code-signal and thereafter-immediately-following received code-space, will be directed for the purpose of building up relative voltages across the plates of the respective character and space condensers of that unit.

Switch contact #1 on the switch-plate 137d of the step switch 137, see Fig. 3, is electrically connected to the character condenser, indicated ICC, see Fig. 1, of the first translating unit, contact #2 to the second (2CC), contact #3 to the third (3CC), contact #4 to the fourth (4CC), and, should further translating units be supplied, then subsequent contacts would be supplied for the respective subsequent units. Similarly, switch contact #1 on the switch-plate 138d of step switch 138 is electrically connected to the space condenser, indicated ISC, of the first translating unit, contact #2 to the second (2SC), contact #3 to the third (3SC), contact #4 to the fourth (4SC), and subsequent contacts to respective subsequent translating units, should any be provided. It should be noted, however, that for a reason hereinafter explained, a normally open, sensitive relay 400 is provided in the line between the step switch 138 and the space condenser of each translating unit. Contact #0 of the step switch 138 is a blank, so there will be no current flow when the apparatus is at rest awaiting the transmission of code.

The switch finger 137h of step switch 137 is electrically connected to the filament circuit of a diode electronic tube, which acts as a valve controlling the supply of electricity to the character condensers of the translating units. This diode is designated CD. The contact 136d of double-keying relay 136 is electrically connected to the plate of the diode CD. It will be noted that arm 136a of the double-keying relay 136 is electrically connected to the main power supply and, therefore, conducts current through the diode into the particular character condenser CC selected by the step switch 137 whenever relay contact 136d is engaged by reason of a code-signal being received by the code-receiving relay 135. The time rate at which a character condenser CC is charged is determined by the setting of the variable resistance or rheostat 401 in the filament circuit of the diode CD.

The contact finger 138h of step-switch 138 is electrically connected with the filament circuit of a diode electronic tube which controls the rate of charging of the space condensers of the translating unit. This diode is designated SD. The contact 136c of double-keying relay 136 is electrically connected with the plate of the diode SD, and, accordingly, the particular condenser SC selected by the step-switch 138 is electrically charged by the main power supply whenever the relay arm 136a engages the contact 136c upon the reception of a code-space immediately following a received code-signal. The time rate of charging a space condenser SC is determined by the setting of the variable resistance 402 in the filament circuit of the diode SD.

*The translating unit*

Each translating unit of the series or sequence of same provided for receiving successive pairs of code-signals and the respective, thereafter-immediately-following code-spaces in any given letter group, comprises, in addition to the aforementioned character and space condensers CC and SC, respectively, means for comparing the respective voltages existing across those condensers, means for impressing the resultant of this comparison on the permutation device, and means for relating the voltage across the space condenser SC to the standard regulator voltage.

In addition, each translating unit has associated therewith means for instantaneously discharging the respective character and space condensers thereof, all as described hereinafter.

In the present instance, see especially Figs. 2, 5, 6, and 7, two triode electronic tubes are utilized to compare the respective voltages existing across the character condenser CC and space condenser SC. One of these triodes, designated CV, has its grid electrically connected to the character condenser CC, while the other, designated SV, has its grid electrically connected to the space condenser SC. Respective grid-batteries 403 are provided to normally bias the grids to respective predetermined negative values, for a purpose presently made clear. The triode CV has its filament circuit electrically connected to the positive side of the space condenser SC, while the triode SV has its filament circuit electrically connected to the positive side of the character condenser CC.

Disposed in the plate circuit of the CV triode is a sensitive relay 404, normally held open, as by means of a spring 404a. Disposed in the plate circuit of the SV triode is a sensitive relay 405, normally held open, as by means of a spring 405a. The grid of the CV triode and the grid of the SV triode are normally biased by their respective batteries 403 to an extent such that when the respective voltages across the character and space condensers are equal, the two triodes are substantially balanced, there being only enough current flowing in the respecve plate circuits thereof as will place the respective sensitive relays 404 and 405 in their critical conditions, just on the verge of closing. In this condition, any change in the magnitude of either the character or space condenser voltage, making one voltage greater than the other, changes the relative grid biases of the triodes. The grid of one then becomes less negatively biased than the other, producing a greater than normal current flow in its plate circuit, which positively energizes its associated sensitive relay and causes it to close. Thus, either the relay 404 or the relay 405 is forcibly closed against the normal spring tension holding it open, whenever there is an unbalance between the grid biases of the respective triodes CV and SV.

The sensitive relay 404 is electrically connected to a relay coil of a corresponding portion of the permutation part of the apparatus (hereinafter described in detail), while the sensitive relay 405 is electrically connected to a second relay coil thereof. Accordingly, the permutation device is set in accordance with the resultant of the comparison between character voltage and space voltage across the respective character and space condensers of each translating unit, to register either a dot or a dash as the case may be. In its normal, unactuated condition, the permutation device is set throughout to register a no-signal.

The adjustable regulator

For the purpose of correlating and controlling the operations of the several component parts of the apparatus, and for accommodating the apparatus to changes in speed of code transmission occurring from time to time during operation thereof, regulator means are provided. Such means may be arranged for either manual or automatic adjustment in the making of the apparatus capable of accommodating various speeds, and changes in speed, of code transmission. The manually adjustable system is illustrated in Figs. 1 and 3, with locations indicated for connecting thereto the automatic system of Fig. 15.

The agency by which regulation is attained is voltage—here spoken of as the "regulator voltage"—which provides a standard reference value changeable from time to time in accordance with change in speed of code transmission. This voltage is provided in the system by the main power supply, and is furnished through the manually adjustable, variable resistance or rheostat 406, at proper, predetermined values.

Each translating unit of Fig. 1, shown per se in Fig. 2, is equipped with a third triode electronic tube, designated SR, for the purpose of relating the voltage of the space condenser SC to the regulator voltage. The grid, of this triode SR is negatively biased by a grid-battery 407, and is electrically connected to the main power supply through the rheostat 406. The regulator voltage from the main power supply normally subtracts from the negative bias of the grid sufficiently to permit such a flow of current in the plate circuit of the triode as will energize the limit switch or relay 400 and hold it closed against the tension of spring 400a.

The space-receiving side (contact 136c) of double-keying relay 136 is electrically connected, through the space diode SD and step-switch 138, to both the space condenser SC and the filament circuit of triode SR whenever the limit switch 400 is closed. The space condenser is directly connected to the filament circuit of the triode. Thus, when the voltage of the space condenser approaches the regulator voltage in value, the resultant grid bias approaches the value of the grid-bias battery 407 voltage. The magnitude of the grid-bias battery voltage is such that the effective plate current flow is critical. A slight increase in plate current flow will hold the relay 400 closed while a slight decrease in plate current will result in the relay or limit switch 400 being opened by relay-spring 400a. Opening of the limit switch 400 cuts off the space condenser SC from its source of supply of electrical current, which means that the extent of charging thereof is limited by the set value of the regulator voltage.

The regulator voltage not only limits the extent of charging of the respective space condensers SC, but also provides a standard reference value for use in determining when letters or other symbols should be printed and when groups of such letters or other symbols, forming words or the like, should be spaced from one another. It is able to serve as it does because other voltages, which are built up at various parts of the system in accordance with the various types of received code-spaces occurring between received code-signals, are built up at different rates of speed (as is fully explained hereinafter).

Space timing system

In order to determine when a group of code-signals corresponding to a letter or other symbol has been completed and must be spaced from a next succeeding group, the longer space occurring between code-signal groups is measured in terms of voltage. This voltage is then related to the regulator voltage for the purpose of actuating the printing mechanism of the apparatus.

As in the case of the code-signals and short code-spaces occurring therebetween, it is convenient to use a condenser to measure the respective voltages of the longer letter spaces between code-signal groups, and to charge such condenser at the desired rate of speed by means of a diode electronic tube.

Only one letter condenser, here designated LC, is needed. It is charged by its own diode LD at a rate of speed determined by the setting of the variable resistance 408 associated with the filament circuit of the diode.

For relating the letter voltage to the regulator voltage in order to bring about printing of the letter (or other symbol) corresponding to a particular series of signals stored up by the permutation part of the apparatus, a triode electronic tube LV is provided. Its grid is given a negative bias, by means of a grid-battery LG, sufficient to permit flow in the plate circuit of enough current to place the sensitive relay coil LR of a triple-switch 409 beyond its critical condition thereby holding the switch away from its spring loaded side.

The triple-switch 409 is equipped with three individual switch arms, 409a, 409b, and 409c, which are held, by means of respective springs 409a—1, 409b—1, 409c—1, in closed positions relative to their respective contacts 409d, 409e, and 409f during such times as the relay coil LR is not effectively energized, that is, during such times as the resultant grid bias due to grid-battery LG, the regulator voltage, and the voltage across the letter condenser LC, halts effective flow of the plate current.

Normally, however, connection of the grid to the main power supply through regulator rheostat 406 brings about a reduction in the negative-biasing effect of grid-battery 408—1 to an extent equivalent to the value of the regulator voltage, an extent which is sufficient to permit the requisite flow of current in the plate circuit for actuating triple-switch 409. Thus, the arms 409a, 409b, and 409c of triple-switch 409 are normally held out of engagement with their respective contacts 409d, 409e, and 409f, the arms 409a and 409b being held against their respective stops 409g and 409h, and the arm 409c being held closed relative to its contact 409i.

The main power supply connects with the filament circuit of triode LV and the positive side of the letter condenser LC through a holding relay 410 and the letter diode LD. The letter condenser is thereby directly connected with the filament circuit of the triode. Accordingly, when the charging of letter condenser LC reaches a stage where the letter voltage approaches the regulator voltage in value, the cancelling-out effect of the regulator voltage on the negative biasing action of grid-battery LG is nullified, effective current ceases to flow in the plate circuit of the triode, and the springs 409a—1, 409b—1, and 409c—1 become operative to close the switch arms 409a, 409b, and 409c, respectively, relative to their respective contacts 409d, 409e and 409f.

Closing of switch arm 409c relative to its contact 409f completes, from the main power supply and through that particular letter (or other symbol) circuit of the permutation part of the apparatus which has been set in accordance with the received code signals, an electrical circuit to the solenoid supplied for that particular letter, here shown as the solenoid 411 associated with the "R" key of the printing device. (Note that both the switch arm 409c and the main power supply are grounded.)

Thus, a particular letter corresponding to a letter-group of received code-signals is printed out by means of a particular letter-solenoid acting on a printing device (described hereinafter) whenever the switch arm 409c is closed relative to its contact 409f. Such closing of triple-switch 409 occurs whenever the voltage across the letter condenser LC approaches the regulator voltage in value.

The holding relay 410 is essentially a double-pole single-throw switch having two coils: a coil 410a, which is electrically connected with the ground and with character contact 136d of double-keying relay 136 so as to be energized whenever relay 136 closes relative to such character contact, and a holding coil 410b, which is energized by reason of the closing of switch arm 410c relative to its corresponding contact 410d, the latter occurring whenever coil 410a is energized. The switch arm 410e of holding relay 410 is, of course, also closed relative to its corresponding contact 410f whenever coil 410a is energized by reason of a code signal being received by the apparatus. It is held in closed position by the energized holding coil 410b, even though double-keying relay 136 opens relative to its character contact 136d and closes relative to its space contact 136c when the code-signal ceases and the subsequent code-space commences.

It should be noted that the switch arms 410c and 410e of holding relay 410 are preferably mechanically interconnected, and are normally held open relative to their respective contacts 410d and 410f by a spring 410—1. Thus, until a code signal is initially received by the apparatus, closing double-keying relay 136 relative to its character contact 136d and thereby energizing relay coil 410a, the circuit for supplying current to the letter condenser LC is open and the condenser will not be charged. Upon the reception of a code-signal, however, and the consequent closing of both switch arms of holding relay 410, the circuit will be closed and current will be routed to the letter condenser during the reception of a subsequent code-space until such time as the triple-switch 409 is actuated by the several springs thereof (in the manner explained hereinbefore). At that time, the switch arm 409c opens relative to its contact 409i, thereby breaking the circuit by which holding coil 410b of holding relay 410 is energized. At the same time, it will be remembered, it also closes relative to its contact 409f and causes a letter to be printed. Thus, upon the printing of a letter, no further current can flow to the letter condenser until the apparatus is re-set to handle a subsequent letter.

Should the code-space mentioned above be a short one of the type occurring between code-signals of a letter-group, the current-supply circuit to the letter condenser remains undisturbed, and, following reception of the next code-signal, is in condition for again routing current to the letter condenser. It should not be thought, however, that there is a sequential building up of charges in the letter condenser as successive short code-spaces occurring between code-signals of a single letter-group of code-signals are received. The letter condenser is discharged, by means hereinafter described, immediately after every partial charging due to the reception of a short code-space.

After any letter (or other symbol) has been printed by the apparatus, it is necessary to determine whether that letter is to stand alone, or at the end of a thereby completed word-group of preceding letters, as the case may be, or whether other letters shall be added to it to complete an unfinished word-group of letters. In order to accomplish this, each extra-long space occurring between word-groups of letters is measured in terms of voltage, which is then related to the regular voltage for the purpose of actuating the word-spacing mechanism of the apparatus.

A word condenser, designated WC, is employed as the word-space measuring means. It is charged by its own diode WD at a rate of speed determined by the setting of the variable resistance 415, associated with the filament circuit of that diode.

A triode electronic tube WV is utilized to relate the voltage of the word condenser WC to the regulator voltage in the same manner as the triode LV relates the voltage of the letter condenser LC to the regulator voltage. A grid-battery 416 corresponds to the grid-battery LG of the triode LV, and the electrical connection between grid and main power supply is similar. A sensitive relay coil WR corresponds to the relay coil LR, but the relay proper or switch 417 has only a single arm 417a, which is held open against a limit-stop 417b so long as effective current is flowing in the plate circuit of the triode, and which is closed relative to its contact 417c by the action of its spring 417a—1 whenever the resultant grid bias due to grid-battery 416, the regulator voltage, and the voltage across the word condenser WC, halts effective flow of the plate current. The filament circuit and the word condenser connect with the main power supply through word diode WD and the space contact 136c of double-keying relay 136, but not through the holding relay 410, since the relay 417 has no release switch for limiting the charging of word condenser WC, as does the letter relay 409, and it is therefore unnecessary to guard against repeated cycles of alternate charging and discharging of the condenser when the apparatus is at rest but ready and awaiting to receive transmitted code.

When the voltage of word condenser WC approaches the regulator voltage in value, effective plate current ceases to flow in the plate circuit of triode WV and relay 417 closes relative to its contact 417c. This closes a local word-spacing circuit comprising a solenoid 418 and a battery 419. The solenoid is mechanically connected to space bar SB of the printing device, so that energization of the solenoid causes word-spacing between groups of printed letters.

It should be noted that the word-spacing circuit may receive its power from the main power supply by appropriate electrical connection therewith. It is only for convenience of illustration that the separate power source 419 is employed.

Permutation and printing devices

In the illustrated embodiments printing is accomplished by a typewriter, which may be of conventional construction in many respects. Instead of the standard platen and carriage, however, it is preferable that an attachment be utilized which will enable printing to be carried out on a continuous ribbon of paper, so there will be no necessity for returning the carriage to an initial position at the end of a line nor for rotating the platen to space lines from top to bottom of a sheet of paper. Typewriters with such an attachment may be purchased on the open market, and constitute no part of the present invention.

It is desirable that the typewriter be electrically actuated and controlled. It may be equipped with individual solenoids for the respective keys, in a manner well known, energization of a solenoid actuating a corresponding key of the typewriter. A separate solenoid may be provided for the space bar of the typewriter for the purpose of word-spacing.

The typewriter as a whole is not illustrated, but one letter-key thereof, the "R" key, is represented diagrammatically with its associated solenoid, 411, as is, also, the space bar, SB with its associated solenoid 418, see Figs. 1 and 3.

The permutation part of the apparatus here conveniently takes the form of a plurality of sets of paired switches 420 and 421, respectively, a set being provided for each symbol which at some time it may be desired to have printed (as, for instance, for each of the several letters of the alphabet, running from A to Z, shown in Fig. 4), and, in each set, paired switches being provided in number corresponding to the total number of translating units in the apparatus.

Corresponding switches of the several sets are mechanically connected in side-by-side relationship, so as to swing as a unit when actuated. The two switches 420 and 421 of each pair are electrically interconnected in series relationship, but those switches which are mechanically connected are electrically insulated from one another, as by the insulating material 422, Fig. 4. Each switch arm is arranged to swing between two opposite switch contacts, a switch arm 420a between switch contacts 420b and 420c and a switch arm 421a between switch contacts 421b and 421c, when actuated by associated master relay coils PR1 and PR2, respectively, or when returned to normal "no-signal" positions by return springs 420—1 and 421—1, respectively. The single master relay coils PR1 and PR2 take care of actuating all the side-by-side, mechanically connected, switch arms 420a and 421a, respectively, associated with a translating unit of the apparatus. Duplicate master relay coils are provided for each translating unit, the coil PR1 being electrically connected with the sensitive relay 405 associated with the SV triode, and the coil PR2 with the sensitive relay 404 associated with the CV triode, so that they are energized when the respective sensitive relays are closed.

Each set of several paired switches 420 and 421, corresponding to a particular letter or symbol which may represent a group of received code-signals, has its switch contacts electrically connected in a manner peculiar to itself, so that, when its several switch arms are thrown in a similar peculiar manner by reason of the reception by the apparatus of a similar peculiar grouping of code-signals, a closed circuit exists between the main power supply and that particular letter solenoid concerned, by way of the particular series of switches.

This is well illustrated by the particular set of several paired switches appearing in Figs. 1, 3, and 4, which is wired to respond to the group of code-signals representing the letter "R," and which is electrically connected to the letter solenoid 411 associated with the "R" typewriter-key. The letter "R" is represented by the code-signals dot dash dot (. _ .), so the wiring is thus: from the main power supply to switch contact 420b of the first translating unit (because the initial reception of a dot code-signal closes sensitive relay 405, energizes master relay coil 1PR1, and throws switch arm 420a into engagement with switch contact 420b, thereby closing the circuit so far as the first translating unit is concerned); from contact 421c of the first translating unit to contact 420c of the second translating unit (the former, because switch arm 421a of the first translating unit is normally urged against its contact 421c by spring tension and master relay coil 1PR2 is only energized by the reception of a dash code-signal; the latter, because the reception of the second code-signal, a dash, leaves arm 420a of the second translating unit in its normal, spring-urged position engaging its contact 420c); from contact 421b of the second translating unit to contact 420b of the third translating unit (the former, because the dash code-signal—effective on the second translating unit—energizes master relay coil 2PR2, which throws arm 421a of the second translating unit into engagement with its contact 421b; the latter, because the reception of the third code-signal, a dot, necessitates the same wiring arrangement as for the first translating unit); from contact 421c of the third translating unit to contact 420c of the fourth translating unit (the former, to complete the similarity of wiring arrangement for the first and third translating units; the latter, because there is no fourth code-signal in the group representing the letter "R" and both switch arms of the fourth translating unit will remain in their normal, spring-urged positions); and from contact 421c of the fourth translating unit to the solenoid 411 (for the reason immediately foregoing).

This wiring arrangement for the letter "R" set or series of paired switches therefore produces a closed circuit from the main power supply to the letter "R" solenoid 411 whenever the letter-group of code-signals dot dash dot (. _ .) is received by the apparatus, resulting in the printing of the letter "R" upon the reception of a subsequent long, letter-type of code-space.

It can be easily seen that other wiring arrangements peculiar to the particular groups of code-signals representing other letters or symbols will result in such other letters or symbols being printed by the apparatus. It is not considered necessary that such other wiring arrangements be detailed here. Accordingly, they are merely indicated diagrammatically in Fig. 4.

Release system

So that the several component parts of the apparatus are placed in initial condition, ready for re-actuation, following the translation and printing of a letter or other symbol from received code-signals, means are provided for discharging the several voltage-measuring condensers of the system.

The discharge must be substantially instantaneous, since time is of the essence in the operation of the apparatus. It is preferable to utilize a special type of triode electronic tube for this purpose, the same being well known and obtainable in the open market under the name "Thyratron." This electronic tube is designed to carry a heavy current flow, and possesses the outstanding characteristic that, given a certain negative bias on its grid such that there will be no flow of current in its plate circuit, lessening of this negative grid bias sufficiently to start the flow of plate current will cause the grid to lose its control beyond the possibility of recovery, even by the restoration of a high negative grid bias. The grid cannot recover control until after current has ceased to flow in the plate circuit of the tube.

This characteristic of a thyratron tube renders it especialy valuable as a condenser-discharging agency. Further, since the tube permits current flow in only one direction, no undesirable oscillations will be set up in the system by a discharging condenser. Too, the discharging of a condenser is substantially instantaneous, as required.

Each condenser of the apparatus is equipped with a corresponding thyratron. Thus, there is a thyratron CT for the character condenser CC of each translating unit, and a thyratron ST for the space condenser SC thereof. Further, there is a thyratron LT for the letter condenser LC, and a thyratron WT for the word condenser WC.

The grids of the respective CT thyratrons and of the respective ST thyratrons are electrically connected in common to the negative terminal of a grid-battery 425 through a resistance 426, the latter serving to protect the grid-battery from short circuiting when the grid-battery circuit is closed by engagement of the switch arm 409b of triple switch 409 with its contact 409e.

The character condensers CC and the space condensers SC of the respective translating units are connected across the filaments and plates of their respective thyratrons CT and ST, and are therefore arranged to be substantially instantaneously discharged by the thyratrons at such times as the negative bias on their grids—furnished by grid-battery 425—is lowered to ground potential by reason of the closing of the grid-battery circuit.

Thus, the closing of switch arm 409b of triple-switch 409 relative to its contact 409e, which is brought about by the action of spring 409b—1 whenever the letter voltage approaches the regulator voltage in value, causes substantially instantaneous discharge of the several CC and SC condensers. This occurs immediately after a letter or other symbol is printed by the printing device of the apparatus. In this connection it should be noted that the springs 409a—1 and 409b—1 are somewhat weaker than the spring 409c—1 so there will be a short, predetermined time lag between the closing of switch arm 409c, which actuates the printing device, and the above-discussed switch arm 409b—1, which causes discharge of the character and space condensers CC and SC, respectively, and 409a—1, which causes discharge of letter condenser LC through thyratron LT.

In order to reset the step switches 137 and 138 to their initial positions following the printing of a letter, a mechanical arrangement operated by an electro-magnet 430, Fig. 3, can be used. The electro-magnet 430 is electrically connected between the main power supply and contact 409f of the triple-switch 409, so that it is energized whenever the switch arm 409c closes relative to the printer contact 409f. In other words, it is energized simultaneously with the printing of a letter or other symbol.

Referring now to the mechanical arrangement illustrated in the upper right-hand corner of Fig. 3, wherein the step switches 137 and 138 are represented from a structural standpoint, as distinguished from their representation diagrammatically in the same figure. The contact fingers 137h and 138h are rigidly connected to respective stub shafts, upon which are rigidly mounted respective pinions arranged to be rotated, step-by-step, by the respective ratchet arms 137a and 138a, the arm 137a being effective as it is pulled upwardly by spring 137g when the solenoid 137f is deenergized, and the arm 138a being effective as it is pulled downwardly by the solenoid 138f when the same is energized. Release arms 137i and 138i are provided for releasing the ratchets of arms 137a and 138a, respectively, whenever the release linkage 431 is actuated by energization of the electro-magnet 430. Spiral springs 137j and 138j, tensioned by movement of the respective contact fingers 137h and 138h from the lower to the higher numbered contacts on the respective switch discs 137d and 138d, serve to return such contact fingers to their respective initial positions when energization of the electro-magnet 430 releases the respective contacts.

The letter thyratron LT is arranged to discharge the letter condenser LC not only following the printing of a letter or other symbol, but also after the reception of each short code-space occurring between successive code-signals of any letter-group of received code-signals.

The grid of the letter thyratron LT is normally negatively biased by a grid-battery 435, which feeds into the grid through a resistance 436. This grid circuit electrically connects with the ground, on one hand, and with the character contact 136d of double-keying relay 136, on the other hand, through a resistance 437, which, by reason of the intermediate connection therewith of the grid circuit, functions as a voltage divider. Accordingly, whenever the double-keying relay 136 is closed relative to its space contact 136c, during the reception of a code-space, the grid battery 435 maintains an effective negative bias on the grid. However, when the double-keying relay 136 closes relative to its character contact 136d, the effective negative bias on the grid is destroyed by the positive charge supplied from the main power supply, and the letter thyratron LT becomes effective to instantaneously discharge the letter condenser LC, which is connected between its filament and plate.

The switch arm 409a and contact 409d of triple switch 409 are also electrically connected with the grid circuit of the letter thyratron LT. Thus, when such switch arm 409a closes relative to its contact 409d, providing a closed circuit across grid battery 435, the negative biasing voltage is reduced placing the grid bias at or near ground potential. The letter thyratron thereupon becomes effective to instantaneously discharge the letter condenser LC.

It should be noted, in this connection, that the spring 409a—1, which brings about the closing of switch arm 409a relative to its contact 409d, as above explained, is somewhat weaker than either of the other springs 409b—1 and 409c—1 of the triple switch. Its action is therefore delayed slightly longer, thereby timing discharge of the letter condenser an instant after the printing of a letter and the resetting of the other portions of the apparatus.

The word thyratron WT is arranged to discharge the word condenser WC during the reception of any and every code-signal, but not, additionally, merely because a letter has been printed, as in the case of the letter thyratron.

The word condenser must hold and continue to receive the charge due to the reception of an extra-long code space denoting word spacing after the printing of a letter, if it is to perform its appointed function successfully.

The grid of the word thyratron WT is supplied with a grid battery 438 which normally provides an effective negative grid bias. This grid circuit of the word thyratron is electrically connected to the voltage divider 437, so that an effective grid bias is maintained at such times as the double-keying relay 136 is closed relative to its space contact 136c, but not when closed relative to its character contact 136d. Since the word condenser WC is connected across the plate and filament of the word thyratron, breaking down of the effective negative grid bias accomplishes the instantaneous discharge of the condenser. This occurs, it should be noted, during such times as a code-signal is being received by the apparatus.

*Operation*

Operative characteristics of the various component parts of the apparatus have been set forth hereinbefore with the structural description. Only correlated operation of the apparatus as a whole remains to be explained.

Consider Figs. 1 and 3, wherein is illustrated the apparatus in its entirety, complete with code-receiving means, distributor means, four individual translating units, permutation means, space-timing means, regulator means, printing and spacing means, and release or resetting means. The whole is pictured in the condition it assumes immediately following the reception of the letter-group of successive code-signals dot dash dot (. _ .), representing the letter "R," but before the actual printing of the letter.

Before the first dot signal was received by the apparatus, the contact finger 137h of step switch 137 rested on its #1 contact, as indicated by dotted lines, and the contact finger 138h of step switch 138 on its #0 contact, also as indicated by dotted lines. The arm 135b of code-receiving relay 135 was held, as shown, out of engagement with its contact 135c, and arm 136a of double-keying relay 136 closed relative to its space contact 136c, also as shown. The relay 404 and the relay 405 of each of the four translating units were open, and the limit-switch 400 of each of the four translating units closed. The several paired switches 420 and 421 of each of the sets thereof in the permutation device were in their respective normal positions, no one of the permutation circuits being closed. The switches 410c and 410e of the holding relay 410 were both open. The arms 409a and 409b of triple switch 409 were held open, against their limit stops 409g and 409h, respectively, and the arm 409c thereof closed relative to its contact 409i, as shown. The spacing-relay 417 was held closed, to thereby energize solenoid 418 and hold the space bar SB in its actuated position.

Upon the reception of the first dot signal, the code-receiving relay 135 closed, thereby closing the double-keying relay 136 relative to its character contact 136d and allowing current to feed from the main power supply to the first character condenser 1CC by way of the rate-controlling diode CD and the #1 contact of the step switch 137. Current from the main power supply energized coil 410a of the holding relay 410, thereby closing the two switches thereof and placing the letter circuit in condition for charging the letter condenser LC from the main power supply by way of the switch 410e of holding-relay 410 and rate-controlling diode LD. The main power supply is connected through contact 136d across the voltage divider 437 which causes a lower grid bias on letter thyratron LT and word thyraton WT. At this time only the word condenser WC is charged, hence it becomes discharged through WT. This action causes the release of space bar SB.

The solenoid 137f of step switch 137, it should be noted, was energized, placing its arm 137a in position to advance its contact finger 137h one step upon the reception of the next subsequent code-space. The solenoid 138f of step switch 138 was also energized, thereby advancing contact finger 138h from the #0 to the #1 contact, ready for handling the subsequent code-space.

During the rest or short code-space which occurred prior to the reception of the next code-signal, the code-receiving relay 135 opened; the solenoid of step switch 137 was de-energized, thereby allowing contact finger 137h to be moved by the spring 137g from the #1 to the #2 contact; double-keying relay 136 closed relative to its space contact 136c; current flowed from the main power supply to the space condenser 1SC of the first translating unit by way of rate-controlling diode SD, the #1 contact of step switch 138, and the closed limit-switch 400 of the first translating unit. Current from the main power supply also flowed to the letter condenser LC by way of the closed holding-relay 410 and the rate-controlling diode LD. Further, current from the main power supply flowed to the word condenser WC by way of rate-controlling diode WD.

Because regulator voltage was impressed upon the grid of the 1SR triode, the 1SC space condenser continued to be charged until the voltage thereacross approached in value the regulator voltage, whereupon current ceased flowing in the plate circuit of the 1SR triode, and its limit-switch 400 opened, thereby positively preventing further charging of that condenser. It should be noted that if the space had been shorter than required to approach the regulator voltage in value limit-switch 400 would not have opened, but the circuit to 1SC would have been opened at step-switch 138.

With both the character condenser 1CC and the space condenser 1SC charged, the respective voltages thereof were compared by the 1CV triode and the 1SV triode, with the result that the relay 405 of the first translating unit closed, and the first group of paired switch units of the permutation device were thereupon closed by master relay 1PR1, all in the manner heretofore explained.

With the exception of the dash signal, relay 135 again closed, the solenoid of step switch 137 was again energized to place such step switch in condition for advancement by its spring 137g upon the next succeeding code-space; the solenoid of step switch 138 was again energized, thereby advancing the contact finger 138h into engagement with its #2 contact; and the character condenser 2CC of the second translating unit was charged. During this time, both the letter condenser LC and the word condenser WC were discharged by their respective thyratrons, in the manner explained hereinbefore.

During the immediately-following short code-space, relay 135 opened; contact finger 137h of step switch 137 was moved from its #2 to its #3 contact; arm 138a of step switch 138 was placed in condition, by its spring 138g, for moving the contact finger 138h into engagement with its #3 contact upon reception of the next code-signal; charging of the space-condenser 2SC was limited by the opening of its limit-switch 400 as its voltage approached the regulator voltage in value; the respective voltages of the character condenser 2CC and space condenser 2SC were compared, thereby causing the second group of paired switch units of the permutation device to be closed by master relay 2PR2, so as to represent a dash signal. Meanwhile, both the letter condenser LC and the word condenser WC were being charged by way of their respective rate-controlling diodes LD and WD.

Upon the reception of the final signal or dot of the "R" letter-group being received, relay 135 closed; step switch 137 was placed in readiness for moving its contact finger 137h into engagement with the #4 contact; step switch 138 was energized to move its contact finger 138h into engagement with its #3 contact; and the character condenser 3CC of the third translating unit was charged. During this time, both the letter condenser LC and word condenser WC were discharged.

During the following code-space, which, in that instance, was a long space of the type occurring between letter-groups of successive code-signals, relay 135 opened; step switch 137 was spring actuated to move its contact finger 137h into engagement with its #4 contact; step switch 138 was made ready to move its contact finger 138h into engagement with its #4 contact upon the reception of a subsequent code-signal; charging of the space condenser 3SC was cut off by the opening of its limit-switch 400 when the voltage thereacross approached the regulator voltage in value; the respective voltages of the character condenser 3CC and space condenser 3SC were compared, and caused master relay 3PR1 to close the third group of paired switch units of the permutation device so as to represent a dot signal. This is the stage of operation illustrated. Continuing from this stage: the letter condenser LC will continue to be charged until the voltage thereof approaches the regulator voltage in value, whereupon the triple switch 409 will open relative to contact 409i, thereby releasing holding switch 410 and then holding switch 409, and will close relative to: first, its contact 409f, which actuates the printing device to print the letter "R" in accordance with the closed circuit existing through the "R" set of paired switches of the permutation device, and which energizes the electro-magnet 430, thereby resetting the step switches 137 and 138 to their initial positions, see the upper right-hand corner of Fig. 3; second, its contact 409e, which accomplishes, through their respective thyratrons, substantially instantaneous discharge of the respective character condensers CC and space condensers SC of the three translating units brought into action; and, third, its contact 409d, which accomplishes discharge of the letter condenser LC.

The letter "R" will then be completely translated from the received group of successive code-signals and interposed short code-spaces, and the apparatus completely reset to its initial condition ready for the reception of further code. That is, all of the apparatus except the word condenser WC will be released. The latter will remain charged until either the reception of a subsequent code-signal by the apparatus brings about its discharge in the manner previously explained, or, should an extra long space follow the letter-group of code-signals which represented the letter "R," the charging of the word condenser WC to an extent where its voltage approaches the regulator voltage in value causes the halting of flow of effective current in the plate circuit of the triode WV, thereby enabling relay 411 to close by spring action, which actuates the letter-spacing mechanism SB of the apparatus.

*Time-voltage relationships*

A matter of great importance in the invention is the manner in which the code-signals and code-spaces are measured, so that adequate time relationships are established between the several operative parts of the apparatus. The measurements are carried out at respectively different time rates. In so doing, not only can a very effective comparison of measurements of respective code-signals be made with the measurements of short code-spaces (the type which occur between successive code-signals of a letter-group of code-signals), but a particular measurement can be adopted as a standard reference value, to which the several varieties of code-spaces (short, long, and extra-long) can be related or compared for the purpose of initiating various essential actions of the apparatus. This standard reference measurement, then, provides a regulator for correlating the actions of the various operative parts of the apparatus.

So far as the present invention is concerned, in the translating of received code, and in the handling of the translated code to accomplish a desired end result, such as the printing of a translated message in the form of letters and words, the time rates at which the various code-space and code-signal voltages are built up in the respective condensers are of outstanding importance.

It would be well now to refer to the graph of Fig. 12, wherein voltage is plotted against time.

As previously mentioned, the embodiments here specifically illustrated are described and explained from the standpoint of Continental code, which is made up of dot-and-dash code-signals with interposed code-spaces, the individual code-signals and code-spaces being respectively equal to or multiples of a single unit of time. The short code-space occurring between successive code-signals of a letter-group of code-signals is equal in length to one unit of time, and, as an important feature of both this and the prior patent application, is used as a value with which a code-signal is compared in order to determine whether that code-signal is a dot or a dash. This is possible because the length of a dot code-signal is also equal to one unit of time, while the length of a dash code-signal is three times as long, or equal to three units of time. With respect to the several types of code-spaces, a long code-space occurring between successive letter-groups of code-signals is equal to three units of time (three times the length of a short code-space), and an extra-long space occurring between word-groupings of letter-groups of code-signals is equal to five units of time (five times the length of a short code-space). The regulator voltage is given a value of 2X volts, "X" being any particular quantity found suitable as a working unit for the particular apparatus concerned. Then the character diode CD is set to charge the character condenser CC of any translating unit at such a rate that a charge of X volts will be obtained in one unit of time, and the space diode SD is set so that it will charge the space condenser SC of any translating unit at the rate of 2X volts in one unit of time. That is, it will take two units of time to charge the character condenser to a value equivalent to the regulator voltage, but only one unit of time to so charge the space condenser. This rate relationship will vary depending upon the type of code used, but is as above-stated for the Continental code.

The letter diode LD is so set as to charge the letter condenser LC at the rate of 2X volts in two units of time, and the word diode WD is so set as to charge the word condenser WC at the rate of 2X volts in four units of time, all as graphically portrayed in Fig. 12.

Referring now to Fig. 5, while keeping in mind the hereinbefore explained operative characteristics of a translating unit of the apparatus, it can be seen that the comparison of a charge of X volts across a character condenser CC with a charge of 2X volts across a corresponding space condenser SC, by means of a triode CV and a triode SV, results in the closing of the associated relay 405 and the registering of a dot signal on the permutation device.

Similarly, it can be seen in Fig. 6 that the comparison of a charge of 3X volts across a character condenser CC with a charge of 2X volts across a corresponding space condenser SC results in the closing of the associated relay 404 and the registering of a dash signal on the permutation device.

Fig. 7 shows that whenever the character condenser CC and the space condenser SC of a translating unit are charged substantially equally, regardless of the value of the charges, both relays 405 and 404 remain open and a no-signal condition is registered on the permutation device.

The diagrammatic representation of Fig. 8 corresponds generally to that of Fig. 5, but shows how the SR triode of a translating unit relates the voltage building up across the space condenser SC to the regulator voltage 2X, bringing about the opening of the associated limit-switch 400 when the voltage across the space condenser approaches the 2X regulator voltage.

The graph of Fig. 9 portrays the charging of a condenser at a particular rate; the voltage across the condenser increasing with time by reason of the rate-controlling diode through which charging is accomplished. It also portrays the substantially instantaneous discharge of the condenser, which is brought about if and when the grid bias of the associated discharge thyratron loses its control.

The graph of Fig. 10 portrays the effect on the rate of current flow through a charge-controlling diode, which results from increasing the filament current of the diode by suitable adjustment of the filament rheostat.

The graph of Fig. 11 illustrates the fact that the higher the negative grid bias of a thyratron, the higher the plate voltage can be before the grid loses control. It should be noted that the grids of the various thyratrons of the apparatus are advantageously biased so high that they will not lose control even though the full voltage of the main power supply be impressed across the condensers concerned.

With respect to the charging of the letter condenser LC and word condenser WC, it should be noted that, in both instances, the condensers measure the full time lengths of their respective code-spacers. That is, charging thereof commences at the same time as the charging of a space condenser SC of a translating unit commences, and continues concurrently therewith.

The regulator voltage can be adjusted to any value necessary for agreement with various degrees of speed of code transmission. In the manually regulated embodiment of Figs. 1 and 3, the regulator voltage is adjusted by means of manually resetting the variable resistance or rheostat 406.

*Automatic regulation*

The present electronic system may be automatically regulated in a manner analogous to the mechanical structure of the hereinbefore referred to Patent No. 2,338,692.

A preferred electronic system for accomplishing this automatic regulation is illustrated diagrammatically in Fig. 15 as an auxiliary of the main electronic system of the invention, to be connected therein by means of the manually operable electric switches 440 and 441, Figs. 1 and 3, at the option of the user. As illustrated, the system of Fig. 15 is electrically tied into the main system at the points marked J, L, M, and N, Figs. 1, 3, and 15. For convenience in explaining the operation of this auxiliary automatic system, the double-keying relay 136 and the two step switches 137 and 138, respectively, are included in the showing of Fig. 15.

As fully explained in the above-mentioned patent, regulation of the apparatus, automatically, is accomplished by utilizing the time length of that short code-space which occurs first in a letter-group of received code-signals as the measure of the regulator value for the next subsequent letter-group of received code-signals. Then, if the letter "E" or the letter "T" (represented by a single dot and a single dash code-signal, respectively) is received after any other letter or symbol which is represented by a group of several code-signals, the regulator value remains unchanged and at the value to which it was set by the measure of that short code-space which occurred first in the immediately preceding letter-group of received code-signals.

From this, it can be seen that the regulator value is reset with every letter or symbol (except E and T). When there is a change in the speed of transmission of code being received, as reflected by differing measurements of time lengths of the first short code-spaces of the respective letter-groups of code-signals, the regulator voltage is properly adjusted automatically.

In the present instance, a condenser SMC is provided for receiving the measurement of the first short code-space in any letter-group of code-signals, a diode SMD being provided for charging the condenser as and when required. In order to retain or hold the measurement of the space-measuring condenser SMC for use in resetting the regulator voltage upon the reception of a next subsequent letter-group of code-signals, two condensers SHC1 and SHC2, respectively, are provided, and are charged alternately, through respective limit-switches 257 and 258, by means of a single diode SHD.

Regulator voltage is maintained by two condensers, the main regulator voltage by a condenser RC and the word-regulator voltage by a condenser WRC. These condensers are charged simultaneously, a convenient way being through a pair of diodes RD and WRD which have common connection with both a limit-switch 295 and a limit-switch 296. It is entirely possible however to accomplish such simultaneous charging through a single diode.

Charging of the several condensers mentioned above is controlled by an auxiliary distributing system, and is advantageously accomplished by suitable connection with the main power supply, as illustrated.

The auxiliary distributing system includes a triple alternator 300, having the three individual alternators 300—1, 300—2, and 300—3. It also includes the two step switches 137—1 and 138—1, auxiliary to the step switches 137 and 138, respectively, of the main system, because it is necessary to route current through the diodes of the automatic system independently of the diodes of the main system. The auxiliary step switches are advantageously connected mechanically with the main ones for simultaneous and corresponding actuation therewith, but should be electrically insulated therefrom, as indicated.

The auxiliary step switch 137—1 is provided with a single contact, #2, which corresponds with the #2 contact of the main step switch 137. It opens and closes with respect to this contact at the same time the main step switch 137 opens and closes with respect to its #2 contact.

The auxiliary step switch 138—1 is similarly related to the main step switch 138 as respects its single contact #1.

The contact finger of auxiliary step switch 138—1 is electrically connected with the auxiliary space contact 136c—1 of double-keying relay 136, while the single contact, #1, thereof is electrically connected with the plate of diode SMD. The filament of this diode is electrically connected with the space-measuring condenser SMC.

Following the reception of the first code-signal in any letter-group of successive code-signals, the double-keying relay 136 closes relative to its space contact 136c and auxiliary space contact 136c—1. Current is thus routed through the single contact, #1, of auxiliary step switch 138—1 (#1 contact engaged by contact finger when this auxiliary step switch was moved one step along with movement of the main step switch 138 from its #0 to its #1 contact during the reception of the first code-signal) and through the diode SMD to the space-measuring condenser SMC, at a rate determined by the setting of the filament-rheostat 450 of the SMD diode, during the time-length of the first short-code-space of the said letter-group of successive code-signals.

The single contact, #1, of auxiliary step switch 138—1 is also electrically connected to the contact finger of alternator 300—2. The black contacts of alternator 300—2 are electrically interconnected and electrically connected in common with the contact of limit switch 295, while the white contacts thereof are also electrically interconnected, but are electrically connected in common with the contact of limit switch 296.

Thus, during the time-length of the first short code-space of the said letter-group of successive code-signals, current flows to either one or the other of the limit-switches 295 and 296, depending upon whether the finger of alternator 300—2 rests on a black contact or a white contact. One or the other of these two limit-switches is normally closed, therefore current will flow through the two diodes RD and WRD, simultaneously, and from there directly to the regulator condenser RC and the word-regulator condenser WRC, respectively. The respective filament-rheostats 451 and 452 of the diodes RD and WRD are set so that the two condensers RC and WRC will be charged at exactly the same rate.

Closing of the limit-switches 295 and 296 depends upon voltage relationships handled by the triodes RV1 and RV2, respectively, as explained in detail hereinafter.

Auxiliary step switch 137—1 has its contact finger electrically connected with the auxiliary character contact 136d—1 of double-keying relay 136, and has its single contact, #2, electrically connected to the plate of the diode SHD. The filament of this diode is electrically connected to the contact finger of the alternator 300—1. A rheostat 453 is connected in its filament-circuit.

The electrically interconnected white contacts of alternator 300—1 are in circuit with the contact of the limit-switch 257, while the electrically interconnected black contacts thereof are in circuit with the contact of the limit-switch 258. The movable arm of limit-switch 257 is electrically connected to the first space-holding condenser SHC1, while the movable arm of limit-switch 258 is electrically connected to the second space-holding condenser SHC2. Thus, it can be seen that either one or the other of the condensers SHC1 and SHC2 is charged through the diode SHD during the reception of the second code-signal in any letter-group of received code-signals. The extent of this charging is limited, however, as explained below, by the value of the voltage across the previously charged space-measuring condenser SMC.

The limit switches 257 and 258 control the extent of charging of their respective space-holding condensers SHC1 and SHC2. They are effective to limit or cut off the charging whenever the respective voltages across the condenser approach in value the voltage across the space-measuring-condenser SMC.

Each of the limit-switches 257 and 258 are, in effect, sensitive relays comprising actuating relay coils located in the plate circuits of associated triodes SHV1 and SHV2, respectively.

An actuating relay coil 257M and energizing battery 257B are included within the plate circuit of triode SHV1, and serve to maintain the limit-switch 257 closed whenever effective current is allowed to flow in the plate circuit by reason of proper modification of the negative grid bias provided by a grid-battery 257c. Such modification is accomplished whenever the space-measuring condenser SMC is charged, because the positive side of such condenser is electrically connected with the grid circuit of the triode.

A similar situation exists with respect to the limit-switch 258, a triode SHV2 being concerned, in place of the triode SHV1.

The positive side of the first space-holding condenser SHC1 is electrically connected with the filament circuit of triode SHV1, as is also the line from the SHD diode through limit-switch 257. Similarly, the positive side of the second space-holding condenser SHC2 is electrically connected with the filament circuit of triode SHV2, as is also the line from the SHD diode through limit-switch 258. Accordingly, when the voltage across either the space-holding condenser SHC1 or the space-holding condenser SHC2 approaches the voltage across the space-measuring condenser SMC in value, the modifying effect of the SMC voltage is canceled-out, and the grid battery (either 257C or 258C) of the particular triode concerned becomes effective to supply a sufficiently high negative bias on the grid of the triode to halt current flow in the plate circuit thereof. Thus, either the limit-switch 257 or the limit-switch 258 opens and cuts-off charging of its associated condenser, either SHC1 or SHC2, as the case may be.

The limit-switches 295 and 296, and associated triodes, RV1 and RV2, respectively, and the single condenser RC, are the structural and functional equivalents of the limit-switches 257 and 258, and their associated triodes, SHV1 and SHV2, respectively, and space-holding condensers, SHC1 and SHC2, respectively. In this case, however, instead of the voltage across the space-measuring condenser SMC providing the modifying influence on the grid biases of the respective triodes, so that plate current will be effective to maintain the respective limit-switches closed, the voltage across space-holding condenser SHC1 provides the modifying influence on the grid bias of triode RV1, and the voltage across the space-holding condenser SHC2 provides the modifying influence on the grid bias of triode RV2.

The charging of regulator condenser RC is limited or cut-off by the opening of either limit-switch 295 or limit-switch 296, as determined by the relating or comparing of the voltage building up across the regulator condenser RC to either the voltage across the space-holding condenser SHC1 or the voltage across the space-holding condenser SHC2, all depending upon whether the contact finger of the alternator 300—2 rests upon a black or a white contact.

The #2 contact of auxiliary step switch 137—1 is electrically connected to the solenoid 301 of the alternator 300 (the alternators 300—1, 300—2, and 300—3 considered collectively), so that the actuating arm of such alternator is pulled back when the solenoid 301 is energized, and is made ready to move the alternator fingers of each of the component alternators from a black contact to a white contact, or vice versa, by spring action when the solenoid is de-energized upon the reception of a code-space.

Since the voltage across either the space-holding condenser SHC1 or the space-holding condenser SHC2, is a measure of the time-length of the first short code-space occurring in the letter-group of successive code-signals preceding any particular letter-group being received by the apparatus, the regulator voltage impressed upon the apparatus as a whole for any letter-group of received code-signals will likewise constitute a measure of the time-length of the first short code-space occurring in that letter-group of received code-signals which immediately precedes the said any letter-group. It follows that, when a letter or other symbol is represented by a single code-signal (the letter "E" by a dot standing alone and the letter "T" by a dash standing alone), the regulator voltage will be unchanged either for or by it.

The rheostat 450 of space-measuring diode SMD is set so the condenser SMC will be charged at the same rate as an SC condenser of a translating unit, but the rheostats 451, 452, and 453 of regulator diode RD, word-regulator diode WRD, and space-holding diode SHD, respectively, are set so the condensers RC, WRC, and SHC1 and SHC2, respectively, will be charged at a very rapid rate.

For releasing the condensers SMC, SHC1, SHC2, and RC upon the printing of a letter by the apparatus, thyratrons SMT, SHT1, SHT2, and RT, respectively, are provided.

The grid circuits of thyratrons SMT and RT are electrically connected directly with the biasing circuit controlled by the second or release switch arm of triple-switch 409, see point "M," so that, when such switch arm is thrown, the grids of such thyratrons will lose control and the respective condensers SMC and RC will be substantially instantaneously discharged.

The grids of thyratrons SHT1 and SHT2 are independently biased by the respective grid-batteries 454 and 455 coupled with the respective grid-resistors 456 and 457. Their grid circuits are electrically connected with the triple-switch through the white and black contacts, respectively, of the alternator 300—3, the contact finger of such alternator being electrically connected with the triple-switch through point M. They are biased independently because they are discharged alternately, one always retaining its charge as a value by which the regulator voltage is reset.

The word regulator condenser WRC is arranged to be discharged independently of the afore-mentioned, and at a later time, namely, upon the reception of the first code-signal following the general release of the apparatus. For this purpose it is provided with a thyratron WRT, having a grid-battery 458 and grid-resistor 459 included in its grid circuit.

A double-pole single-throw holding relay or switch 460, having the two arms 460a and 460b and the two coils 460c and 460d, is connected into the main circuit at N. When the letter is printed, coil 460c becomes energized and causes both switch arms 460a and 460b to close. Closing of switch arm 460a connects the main power supply across coil 460d, thereby energizing the latter.

When the next code-signal is received following the printing of a letter and the general release of the apparatus, the circuit from the main power supply to the coil 461a of a word-release switch 461 becomes closed through switch-arm 460b of holding relay 460, thereby closing the release switch-arm 461c, and connecting the grid circuit of thyratron WRT to ground; whereupon the grid of thyratron WRT loses control and the word-regulator condenser WRC is discharged.

It should be noted that the word-release switch 461 is arranged, by proper selection of its respective return springs, so its release switch-arm 461c is actuated a moment before its normally-closed switch-arm 461b. Thus, the thyratron WRT has time to discharge the condenser WRC before the coil 461a is de-energized by the opening of such normally-closed switch-arm 461b.

Upon the opening of switch-arm 461b the circuit to coil 460d through switch-arm 460a becomes open. Consequently switch-arms 460a and 460b open. Thus coil 461a no longer receives current, consequently the switch-arms 461c and 461b return to their normal positions, 461c being normally open and 461b being normally closed.

A graphic illustration of the manner in which this automatic system functions is shown in Fig. 16. The SHC1 voltage is at some particular value where it had been previously set. As the first space starts, the first space voltage begins to rise at its normal rate. The space SMC voltage rises at the same rate, but the regulator and word-regulator voltages rise at a very rapid rate. As the regulator voltage and the word regulator voltage approach the value of the SHC1 voltage, their voltage rise is stopped by the opening of switch 295. (296 if SHC2 voltage is being used as reference). As the first space voltage approaches that of the regulator voltage, the limit switch 400 of Fig. 1 opens and stop the first space voltage at the same value as that of the regulator. All other space voltages are regulated in the same way, since the regulator voltage remains at its particular value for the duration of the letter. If the first space actually continued for a longer time, then the space measurer voltage would also continue rising, as illustrated. At the start of the second character the SHC2 voltage, which in this case had been at zero, would rise very rapidly until it approached the value of the SMC voltage, where it would stop. When the letter is printed, all of the voltages except the SHC2 voltage and the word-regulator voltage will drop to zero. The SHC2 voltage will then be the standard used in the following letter to limit the regulator and word-regulator voltages. As stated previously, in the event of the reception of an E or T the triple alternator 300 would not have moved, since there would have been no second character to cause it to do so; hence, in Fig. 16, the SHC1 voltage will remain up, and will be the voltage which limits the regulator and word-regulator voltage on the following letter. In such a case, the SHC2 voltage will have returned to zero with the others and left the SHC1 voltage remaining up. The word-regulator voltage, it should be noted, falls to zero at the start of the first character of each letter or symbol.

Fig. 17 illustrates another relationship, wherein the first code-space actually stopped before the first space voltage reached that of the regulator. Note that SMC also stopped at the same voltage. When the SHC2 voltage rises, it stops at the position of the SMC voltage.

*Alternative constructions*

A thyratron electronic tube is a convenient device to use in the apparatus for the purpose of substantially instantaneously discharging a condenser. It is designed especially for a use of this kind, and can carry a heavy current flow. Other electronic tubes may be employed for the purpose, however, as can also various circuit arrangements.

In Fig. 13 is illustrated a circuit arrangement embodying a switch 465, a resistor 466 and a rectifier tube 467. The condenser is indicated CC, the diode CD, and the main power supply MPS. Upon closing the switch 465, the condenser CC will discharge through the resistor 466 and the rectifier 467. The discharge will be free of undesirable oscillation because of the rectifier tube, and the condenser and switch contacts will be protected from damage by the heavy flow of discharging current because the resistor 466 absorbs such current.

It is possible to use merely the switch 465 for short circuiting the condenser, thereby discharging the same; but there would be likelihood of damage to the condenser, the switch would have to be specially designed to eliminate pitting due to the heavy current flow, and undesirable oscillation would occur.

In the arrangement of the several triodes and associated sensitive relays of the apparatus, different wiring connections can be made if desired. For example, a triode SR of a translating unit may have its grid electrically connected to the positive side of the corresponding space condenser SC, instead of to the source of supply of the regulator voltage, and may have its filament circuit electrically connected to the source of supply of regulator voltage, instead of to the positive side of the space condenser SC. Under these circumstances, the sensitive relay 400 would have to be arranged so as to be open, preventing flow of current to the space condenser, whenever current flows in the plate circuit of the triode, and so as to be closed, permitting flow of current to the space condenser, whenever the negative grid bias due to grid battery 403 is effective to prevent flow of current in the plate circuit of the triode.

It should be noted that the use of triodes in the manner contemplated by this invention makes it possible to actuate relays without draining energy from the condensers holding the voltages constituting measurement values. If there are any losses of energy from the condensers to the triodes, they are negligible. Thus, the measurement values are maintained functionally intact throughout the operation of the apparatus.

In the actual construction of the apparatus, fewer batteries than illustrated would be used. For instance, a single battery could supply the filaments of both the character thyratrons and the space thyratrons. This arrangement is not shown here for the reason that its illustration would be considerably less convenient than the arrangement shown. Likewise, the system is grounded at several convenient locations to further simplify the wiring.

If it is desired that some other type of code transmission than radio-telegraph be accommodated by the apparatus, the code-receiving relay 135 may be added to or changed to suit. For instance, if it is desired that "blinker" transmission be handled, a suitable photoelectric unit would be employed as the code-receiving means.

A somewhat different embodiment of the invention is illustrated in Figs. 18, 19, 20, and 21. The translating units of the apparatus are changed somewhat, as is, also, the permutation device. These changes have necessitated certain additions to the distributor step-switch 137.

From each translating unit, one of the character-and-space-voltage-comparing triodes has been eliminated. Only the CV triode and the SR triode remain. They function, however, as they do in the translating units of Figs. 1 and 2.

Thus, the positive sides of the respective character condensers CC are electrically connected to the grid circuits of the respective triodes CV, while the positive sides of the respective space condensers SC are electrically connected to the filament circuits thereof, the grids being normally biased by the respective grid-batteries 403 to such value that the respective sensitive relays 404, disposed in the plate circuits of the respective triodes, will be placed in critical condition ready to remain open or to close depending upon the respective resultants of the comparing operations.

Likewise, the grid circuits of the respective triodes SR are electrically connected to the source of regulator voltage—in the manually regulated system, to rheostat 406 (not shown in this view, see Figs. 1 and 3) and, in the automatically regulated system, to the positive side of the regulator condenser RC (not shown in this view, see Fig. 15). The positive sides of the respective space condensers SC are electrically connected to the filament circuits of the respective triodes. The grids of the respective triodes are normally negatively biased by the respective grid-batteries 407 to such value that effective current will flow in the plate circuits of the respective triodes whenever regulator voltage is supplied thereto without a substantially equal quantity of space condenser voltage being supplied to the filament circuits. Under such circumstances, plate current will energize the respective sensitive relays or limit-switches 400, maintaining them closed. Whenever voltage across the respective condensers SC approaches or equals the regulator voltage in value, such regulator voltage is canceled out and the negative grid-biases supplied by the respective grid-batteries 407 become active to prevent effective flow of plate current, thereby causing the respective sensitive relays or limit-switches 400 to open and cut-off charging of their respective space condensers.

The permutation device is here made up of sequentially correlated sets of single switch units (rather than of double or paired switch units as in the previously described embodiment). Each single switch unit, designated 550, has a switch-arm 550a. In all switch units except the first of any sequentially correlated set the switch arm 550a is arranged to engage an electrical contact 550b at the outward limit of its throw-stroke, and to engage either one or the other of two electrical contacts, 550c and 550d, within the limits of its throw-stroke, depending upon whether the triode CV of that particular translating unit registers a dot or a dash.

As shown, the sensitive relay 404 of the first translating unit is open. Accordingly, switch-arm 550a of that translating unit rests against its electrical contact 550c, thereby registering the dot signal translated by that first translating unit.

It should be here noted that the first switch unit of any set is substantially identical with the others except for the absence of the electrical contact 550b which enables a no-signal condition to be registered. It is not necessary that the first translating unit and associated first switch unit of the permutation device register a no-signal condition.

The sensitive relay 404 of the second translating unit is closed. Accordingly, switch arm 550a of the second switch unit of any set rests against its electrical contact 550d, thereby registering the dash signal translated by that second translating unit.

A complete set of switch units 550 is not illustrated, but the remainder are similar in construction to the second above-described, and operate similarly.

Each one of the groups of side-by-side, mechanically connected, corresponding switch units 550 in the several sets of sequentially aligned switch units is equipped with a master relay coil 552, which is energized or not depending upon whether the sensitive relay 404 of the corresponding translating unit is closed or open. Further, each one of said groups of switch units, except the first, is equipped with a second master relay coil 552A, as illustrated. The purpose of these second master relay coils 552A is to move the respective switch units 550 from their no-signal positions to their dot positions whenever respective code-signals are received by the apparatus, regardless of whether such code-signals are dots or dashes.

In order to energize the proper one of these second master relay coils 552A upon the reception of a code-signal by the apparatus, an auxiliary step-switch 137—2 is provided. It is mechanically connected to but electrically insulated from the main step-switch 137, and is arranged to move simultaneously and correspondingly therewith.

The successive contact points of auxiliary step-switch 137—2 are electrically connected to the second master relay coils 552A associated with the respective successive translating units—that is, all except #1 contact point, which is a blank for the reason that there is no second master relay coil associated with the first translating unit (as explained before, there need be no no-signal condition registered by the permutation device for the first translating unit).

The contact finger 137—2h of the auxiliary step-switch 137—2 is broad, so that, as it moves on to a new contact point, it continues to engage all previous contact points. Thus, since such contact finger is electrically connected to the main power supply through character contact 136d of double-keying relay 136, all previous contact points continue to forward power to their respective second master relay coils 552A even though the contact finger 137—2h moves forwardly relative thereto.

Each switch unit 550, except the first, in any set is provided with a compound spring arrangement 551, having one component compression spring 551a which is relatively weaker than a second and shorter component compression spring 551b. Such compound spring arrangement is placed to act between the switch-arm 550a and the master relay coils 552 and 552A, thereby opposing the actions of such master relay coils. It should be noted that a master relay coil 552A is powerful enough, when energized, to close a switch-arm 550a relative to its dot contact point 550c, but is not powerful enough to overcome the resistance of the relatively strong compression spring component 551b of the compound spring arrangement 551. Thus, a switch-arm 550a is moved into engagement with its dot contact point 550c whenever a corresponding code-signal is received by the apparatus, unless that code-signal is a dash. If the latter is true, closing of relay 404 of the corresponding translating unit energizes the second master relay coil 552A, which, in combination with its associated master relay coil 552, is powerful enough to overcome the resistance of this second and shorter component spring 551b.

In Fig. 19 is illustrated the position of switch-arm 550a when a no-signal condition is registered by a switch unit 550; in Fig. 20, the same when a dot code-signal is registered; and, in Fig. 21, the same when a dash code-signal is registered.

Release of the apparatus, upon the printing of a letter or other symbol registered by the permutation device, is accomplished in the same manner as fully explained hereinbefore in connection with the embodiment of Figs. 1, 2 and 3. Thyratrons CT and ST are provided in each of the respective translating units for this purpose.

Alternative distributor

The distributor illustrated in Fig. 14 serves the same purpose as the step-switches 137 and 138 shown in Figs. 1, 3, and 15, and may replace the same. This distributor is faster in its actuation, since movement of the switch arms is limited to a smaller distance, also, the nature of the movement is such as to require less power. A major feature of this distributor is that when the mechanism is released for return to its original position, all switch arms move through the same minimum movement, whereas, in the previously described distributor, the sliding contacts of the step-switches slide over successive fixed contacts until the start position is finally reached.

This distributor is connected into the system in the following manner. Points A, B, C, D and E of Fig. 14 connect with corresponding points in Figs. 1 and 3. Connections marked ICC—a and ISC—a as well as successive connections for each of the translating units are respectively connected to corresponding points in Figs. 1 and 3. Connection ISR—a is joined with the corresponding point in Fig. 15. This circuit replaces the step-switch member 138—1. Connection 2CR—a is joined with the corresponding point in Fig. 15. This circuit replaces the step-switch member 137—1.

The connections identified in Fig. 14 by the letters K and N are respectively connected to locations also marked K and N in Figs. 1 and 3.

The distributor consists of a group of relays having a number of switch-arms associated with each relay. The switch arms of each relay are mechanically connected together but are electrically insulated from one another.

The dash-dot lines 472 in Fig. 14 indicate the tying together of the associated switch-arms.

The various switch-arm groups are held in their normal positions by the springs 473.

A double acting keying relay 470 having switch-arm 470a and contacts 470c and 470s is used to successively energize the respective holding relays ISM, 2CM, etc.

Switch arm 470a is normally held in contact with 470s by spring 470b.

A release relay 430a is connected to the points K and N as shown in Fig. 14. This release relay 430a has switch-arm 430b and contact 430c associated with it. The return circuit to ground passes through 430c and 430b hence when this circuit becomes open the remaining relays of the distributor become released.

As stated previously, in order to accomplish distribution by means which are faster and which do not require a large reversal of direction such as the step-switch sliding contact, a system of relays herein called a distributor is illustrated in Fig. 14. Each relay consists of an electromagnet or other suitable device and each has several movable switch arms for making and breaking the various circuits as desired. The number of switch-arms depends upon the particular location of the particular relay within the system. For the purpose of illustration one relay with its six switch-arms is shown contained within the dotted rectangular enclosure 471. The magnet is marked 2SM while the six switch-arms are marked ISZ, ISX, ISY, 2CL, 3CO, and 2SH. All other relays are arranged in a similar fashion. The mark 2CM represents the second character magnet, etc. In a similar manner other circuits are designated by numbers followed by letters. The numbers of such a combination represent the order of the distribution and the letter immediately following in each case is either a C or an S indicating character or space. The second letter of each group is one which has been assigned for the purpose of additional identification.

In addition to the distributor, the relays 136 and 470 are shown keyed by relay #135 and using power from the main power supply.

It should be noted that the switch-arms are connected in two groups. One group is associated with the relay 470 and this group is used for the purpose of connecting and disconnecting the various circuits to the relay magnets ISM, 2CM, etc., so that they will function in the proper sequence. The spring loaded switch-arm of the relay 470 is held on the space circuit side for periods during which no signal is being received. During the periods when a signal known as a character is in progress the switch-arm is held on the character circuit side. This alternate movement successively energizes the relay magnets which remain energized and holds their respective switch-arms in a removed position until the end of the letter or symbol at which time all are automatically released and return to their starting positions.

The second group of switch-arms are associated with the relay 136 and the character and space diodes. This group successively distributes the output of both diodes in the proper sequence to the respective character and space condensers through the connections ICC—a, ISC—a, etc. as hereinbefore described and in accordance with the successive functioning of relays 470, ISM, 2CM, etc.

The number of relays required for the distributor depends upon the number of translating units within the particular apparatus for which distribution is needed. The distributor shown in Fig. 14 is based upon a system designed to receive letters having up to and including four characters. In order to handle letters, symbols, etc. having more than four characters it is necessary to add more relays to the distributor. (In the Continental code four characters is the maximum for letters however other symbols have a greater number.)

When the machine is at rest relays 136 and 470 are positioned so that they direct energy to the space circuits. As a result of the open position of the relays within the distributor which are associated with the space circuit there is actually no flow of energy at this time. When the first character starts, relays 136 and 470 become positioned so that they direct energy to the character circuits. Energy flows through the character diode and the closed switch ICY associated with 2CM and from there the energy flows to the first character condenser ICC. ISM becomes energized and thereby closes the switches ISW, ISX, 2CO, and ISH. When the first space starts, relay 136 routes energy through the space diode and switch ISX which had just become closed during the duration of the first character. The energy then passes through switch ISY which is normally in the closed position. From there the electrical energy travels to the first space condenser ISC. Current originating from the main power supply travels through switch-arm 470a and contact 470s through switch arm ISW and through switch-arm ISZ to connection ISR—a. It is to be noted that when ISH closed it then connected ISM to the power supply independently of the relay 470. Once ISM becomes energized it closes ISH and when this switch is closed, ISM continues to remain energized until released by some other means at a future time. The same condition holds true for all of the similar relay magnets.

Since 2CO is closed, the circuit to 2CM became completed at the start of the first space hence 2CM became energized and closed the switches 2CW, 2CX, 2SO and 2CH while opening the switches 1CY and 1SL. The opening of 1CY disconnects the distributor from the first character condenser 1CC so that during the second character no energy will go to the first character condenser. The closing of 2CX prepares the distributor so that when the second character starts, the energy will be routed to the second character condenser 2CC. Note that at this time the first space is still in progress. The closing of 2CW prepares the circuit so that when the second character starts, there will be a complete circuit from the main power supply through to connection 2CR—a. The opening of switch 1SL disconnects 1SM from the character circuit side of the relay 470. This is done to prevent the relay 470 from becoming shorted out. The closing of 2SO completes a circuit to 2SM so that at a later time when the following character starts, 2SM will then become energized. The closing of 2CH connects 2CM to the power supply directly.

When the second character starts 2SM becomes energized and 2CL opens the circuit to 2CM to prevent shorting out relay 470 at a following time. Energy is also routed through 2CX and 2CY to the second character condenser 2CC. The sequence of events just described continues until the end of the letter or symbol when the release relay 430a opens the circuit between 430b and 430c which are in series with the common return circuit of the distributor relays 1SM, 2CM, etc., hence they all return to their original positions. In other words the relays become released. This places the various switch-arms associated therewith, in their normal positions as illustrated in Fig. 14.

Note also that the arrangement for the last character and space switch circuits is slightly different from the others. This is so because it is not necessary to prepare the way for additional characters since the character is intended to be the last one the machine will accommodate.

Another matter worthy of note is that the distributor functions in a manner such that during the receipt of a character, the subsequent space circuit is being set up so that it will be in readiness for the space when it comes. Also during the receipt of the space, the following character circuit is made ready.

Whereas this invention is here described with respect to preferred specific embodiments thereof, it should be understood that various changes can be made in said specific embodiments and various other specific embodiments may be developed by those skilled in the art without departing from the spirit and generic scope of the invention as set forth herein and in the following claims.

I claim:

1. In code-controlled apparatus, means for measuring the time-lengths of respective received code-signals; means for measuring the time-lengths of respective code-spaces; adjustable regulator means for establishing predetermined maximum values which the said code-space measuring means cannot exceed; means for comparing a measured code-signal with a measured code-space; result-producing means arranged to be controlled by said comparing means; additional measuring means for code-spaces, said additional measuring means being subject to and limited by the said adjustable regulator means; and individual rate-controlling means associated with the respective measuring means for code-spaces, including that first-named, the said rate-controlling means being operative to cause the measuring to be carried out at respectively different rates.

2. In code-controlled apparatus, an electrical condenser for measuring the time-length of a received code-signal; a second electrical condenser for measuring the time-length of a code-space; means for charging the code-signal condenser at a predetermined rate; means for charging the code-space condenser at a different predetermined rate; means for establishing a regulator voltage; means for limiting the charging of the code-space condenser to a value not exceeding that of the regulator voltage; means for comparing the charge across the code-signal condenser with the charge across the code-space condenser; and result-producing means arranged to be variably actuated by said charge-comparing means.

3. In code-controlled apparatus, a plurality of storing means for electricity; individual means for charging certain of said storing means at a given time-rate and others at various differing time-rates; and means for discharging said plurality of storing means.

4. In code-controlled apparatus, a pair of electrical condensers; a pair of diode electronic tubes arranged to respectively control the time-rates of charging of said condensers; a pair of triode electronic tubes having filament, grid, and plate circuits respectively; a sensitive relay disposed in the plate circuit of each of said triodes; means normally biasing the grid of each of said triodes to such a negative value as will allow no more plate current to flow than is just sufficient to place its associated relay in critical condition; and electrical connections between the said pair of condensers and the grid and filament circuits of said triodes, in mutually opposing relation, whereby unbalanced conditions existing between the respective condensers of said pair overcome the said grid-bias of one or the other of said triodes and cause plate current to flow therein, energizing the corresponding sensitive relay.

5. In code-controlled apparatus, means establishing a regulator voltage; an electrical condenser; means for charging said electrical condenser at a prescribed time-rate; a triode electronic tube having filament, grid, and plate circuits; a sensitive relay disposed in the plate circuit of said triode; means normally biasing the grid of said triode to such a negative value as will allow no more plate current to flow than is just sufficient to place the said relay in critical condition; and electrical connections between the said regulator-voltage-means and the said triode, and between the said condenser and the said triode, in mutually opposing relation, whereby the regulator voltage reduces the said grid-bias and thereby produces flow of plate current, unless substantially canceled-out by the voltage across the said condenser.

6. In code-controlled apparatus, means establishing an electrical measurement representative of a received code-signal; means establishing an electrical measurement representative of a code-space of the type which occurs between successive code-signals of a group of successive code-signals; electrical means for comparing said electrical measurements; and means responsive to said electrical comparing means.

7. In code-controlled apparatus, means for receiving transmitted code-signals, means establishing a voltage corresponding to a received code-signal; means establishing a second voltage corresponding to a code-space; means for comparing the two voltages; and means including permutation means responsive to the said comparing means.

8. Structure as recited in claim 7, wherein means are provided for limiting the value of the second of said voltages in accordance with a predetermined standard reference value.

9. Code - controlled apparatus, comprising code-receiving means; a plurality of individual translating units arranged sequentially and each equipped with an electrical condenser for measuring the time-length of a received code-signal and a second electrical condenser for measuring at least part of the time-length of the next subsequent code-space, and, further, with electrical means for comparing a measured code-signal with a measured code-space; electrical power means; means for charging the code-signal condenser of any of the said plurality of translating units at a certain time-rate during the reception of a code-signal, and means for charging the corresponding code-space condenser at a more rapid time-rate during at least part of the next subsequent code-space; electrical distributor means for routing current from said charging means to the particular translating unit concerned, upon the reception of any code-signal and the next subsequent code-space; permutation means associated with said translating units and arranged to be variably set by the said comparing means; operative means arranged to be variably controlled by said permutation means; space-timing means, comprising one or more electrical condensers, one or more means for charging said condensers, respectively, at time rates slower than the charging of the space condensers of said translating units, one or more triode electronic tubes associated with the one or more condensers, respectively, and each having filament, grid, and plate circuits, sensitive relay means disposed in the plate circuit of each triode, means normally biasing the grid of each triode to such a negative value as will allow no more plate current to flow than is just sufficient to place the sensitive relay means of each triode in critical condition, regulator means, comprising variable means establishing a regulator voltage which may be varied in value from time to time during operation of the apparatus, respective triode electronic tubes for the translating units, each of said triodes having filament, grid, and plate circuits, respective sensitive relays disposed in the plate circuits of said tubes and arranged to control the circuits charging the respective space-condensers of said translating units, means normally biasing the grids of the respective triodes so no plate current flows and said sensitive relays remain open, means electrically connecting the source of said regulator voltage to the grid of each tube for overcoming the normal negative bias imparted to the respective grids by said biasing means and thereby maintaining the respective sensitive relays closed, and means electrically connecting the positive sides of the space condensers of the respective translating units to the plate circuits of the respective triodes, whereby when the charge across any space condenser approaches the said regulator voltage, the said regulator voltage is canceled out and current ceases to flow in the plate circuit of the particular triode concerned, thereby opening the particular sensitive relay concerned and limiting charging of that space condenser to the value of the said regulator voltage; and respective means for substantially instantaneously discharging the condensers of the apparatus, said operative means associated with the permutation device and at least a part of said condenser-discharging means being brought into operation by the closing of said sensitive relay means associated with the one or more triodes of said space-timing means.

10. In a code-controlled apparatus, means for electrically measuring each short code-space which occurs first in any group of successive code-signals received by the apparatus; means for electrically holding the respective measurements made by said measuring means; and means for establishing respective electrical regulator values which are substantially equivalent to the respective electrical measurements held by said holding means, for use during the respectively next subsequent groups of successive code-signals.

11. In a code-controlled apparatus, means for establishing a regulator value which represents one unit of time; respective means for establishing values corresponding to the various code elements, respectively. said respective means being arranged to establish the said values at respectively different time rates, depending upon the particular code elements involved; and means correlating the said code element values with the said regulator value.

12. In code-controlled apparatus, means for receiving the measurement of a received code-signal; means for receiving the measurement of a thereafter-immediately-following code-space; means controlling the rate of measuring of said received code-signal; means controlling the rate of measuring of said code-space; and means for comparing the received measurement of the said code-signal with the received measurement of the said code-space.

13. In code-controlled apparatus, electrical means for receiving the measurement of a received code-signal; electrical means for receiving the measurement of a thereafter-immediately-following code-space; electrical means controlling the rate of measuring of said received code-signal; electrical means controlling the rate of measuring of said code-space; and electrical means for comparing the received measurement of the said code-signal with the received measurement of the said code-space.

14. In code-controlled apparatus, means for measuring the full time length of a received code-space of the type which occur between successive code-signals of a group of succesive code-signals; means for measuring the full time length of a received code-space of the type which occur between successive groups of successive code-signals; means for measuring the full time length of a received code-space of the type which occur between successive groupings of successive groups of successive code-signals; said measuring means operating at respectively different rates of measuring; and regulator means common to all three of said measuring means and providing a standard reference of measurement for the said apparatus.

15. In code-controlled apparatus, translating means; a permutation device having a plurality of single switch elements arranged to be respectively actuated by said translating means, each of said single switch elements of the permutation device, except the first, having three electrical contact points arranged to register, respectively, a no-signal condition, a received dot code-signal, and a received dash code-signal, and said translating means comprising means for comparing a received code-signal with a received code-space, and means responsive to said comparing means for properly setting the respectively associated single switch elements of said permutation device.

16. In code-controlled apparatus, a plurality of translating units arranged sequentially; a permutation device having a plurality of single switch elements arranged to be respectively actuated by the respectively corresponding translating units, each of said single switch elements, except the first, having three electrical contact points arranged to register, respectively a no-signal condition, a received dot code-signal, and a received dash code-signal, and each of said translating units comprising means for comparing a received code-signal with a received code-space, and means responsive to said comparing means for properly setting its associated single switch element of said permutation device.

17. A distributor for controlling the charging of electrical condenser means, comprising a sequentially aligned group of electrical relays; a plurality of switch-arms associated with each relay of said group; means for supplying electrical power to said distributor; keying means for routing electrical impulses in a predetermined manner through certain of said plurality of switch-arms; a second keying means associated with a plurality of diode electronic tubes, said keying means being arranged to route electrical impulses in a predetermined manner through certain other of said plurality of switch-arms, so that they ultimately arrive at said electrical condenser means and electrically charge the same at predetermined time-rates; control means for routing electrical impulses from said electrical power supplying means to both of said keying means; and means for releasing and resetting said distributor means after any given operation thereof.

18. In code-controlled apparatus, electrical storing means for measuring the time-length of a received code-signal; electrical storing means for measuring the time-length of a code-space; means for electrically charging the code-signal storing means at a predetermined rate; means for electrically charging the code-space storing means at a different predetermined rate; means for establishing an electrical value as a regulating measurement; means for limiting the charging of the code-space storing means to a value not exceeding the said regulating electrical value; means for comparing the charge of the code-signal storing means with the charge of the code-space storing means; and result-producing means arranged to be variably actuated by said charge-comparing means.

19. In code-controlled apparatus, means for receiving transmitted code-signals; electrical means controlled by the received code-signals for supplying individual charges of electricity which vary in accordance with the relative durations of the said received code-signals; electrical means controlled by the code-spaces which occur between said received code-signals for supplying individual charges of electricity which vary in accordance with the relative durations of the said spaces; means for quantitatively comparing the respective individual code-signal charges with the respective individual code-space charges; and result-producing means variably responsive to said charge-comparing means.

20. The combination recited in claim 19 wherein there are provided respective rate-governing means establishing different time rates at which said individual charges corresponding to received code-signals and said individual charges corresponding to code-spaced are built up relative to each other.

21. In code-controlled apparatus, means for receiving transmitted code-signals; means for supplying a regulating charge of electricity; a plurality of electrical means controlled by code-spaces occurring between received code-signals for supplying respective individual charges of electricity; a corresponding plurality of rate-governing means establishing relative time rates at which said individual charges of electricity will be built up; a corresponding plurality of means for relating the respective individual charges of electricity to the said regulating charge; and a corresponding plurality of result-producing means arranged for respective actuation when given relationships exist between the said respective individual charges and the said regulating charge.

22. The combination recited in claim 21 wherein there is provided means for automatically adjusting said regulating-charge-supplying-means in accordance with variations in the time length of a given type of code-space occurring from time to time during the transmission of said code.

23. In code-controlled apparatus, means for receiving transmitted code-signals; electrical means controlled by the received code-signals for supplying individual charges of electricity which vary in accordance with the relative durations of the said received code-signals; electrical means controlled by the code-spaced which occur between said received code-signals for supplying individual charges of electricity which vary in accordance with the relative durations of the said spaces; respective rate-governing means establishing different time rates at which said individual charges corresponding to received code-signals and said individual charges corresponding to code-spaces are built up relative to each other; means for quantitatively comparing the respective individual code-signal charges with the respective individual code-space charges; result-producing means variably responsive to said charge-comparing means; means supplying a regulating charge of electricity; means for relating the individual code-space charges of electricity to the said regulating charge; cut-off means controlling the said code-space charge-supplying means, said cut-off means being arranged for actuation when a given relationship exists between a code-space charge and the said regulating charge; a plurality of additional electrical means controlled by said code-spaces for supplying respective individual charges of electricity; a corresponding plurality of rate-governing means establishing relative time rates at which said individual charges will be built up; a corresponding plurality of means for relating the respective individual charges to the said regulating charge; and a corresponding plurality of result-producing means arranged for respective actuation when given relationships exist between the said respective individual charges and the said regulating charge.

ARTHUR C. WINTER.